(12) United States Patent
Monkowski et al.

(10) Patent No.: US 7,823,436 B2
(45) Date of Patent: Nov. 2, 2010

(54) METHOD AND APPARATUS FOR IN SITU TESTING OF GAS FLOW CONTROLLERS

(75) Inventors: Joseph R. Monkowski, Danville, CA (US); Jialing Chen, Sunnyvale, CA (US); Tao Ding, Pleasanton, CA (US); James MacAllen Chalmers, Danville, CA (US)

(73) Assignee: Pivotal Systems Corporation, Pleasanton, CA (US)

( * ) Notice: Subject to any disclaimer, the term of this patent is extended or adjusted under 35 U.S.C. 154(b) by 0 days.

(21) Appl. No.: 12/354,723

(22) Filed: Jan. 15, 2009

(65) Prior Publication Data

US 2009/0183548 A1 Jul. 23, 2009

Related U.S. Application Data

(60) Provisional application No. 61/022,026, filed on Jan. 18, 2008, provisional application No. 61/090,147, filed on Aug. 19, 2008, provisional application No. 61/080,196, filed on Jul. 11, 2008.

(51) Int. Cl.
*G01P 21/00* (2006.01)
(52) U.S. Cl. ..................................... 73/1.26
(58) Field of Classification Search ................ None
See application file for complete search history.

(56) References Cited

U.S. PATENT DOCUMENTS

| | | | |
|---|---|---|---|
| 4,285,245 A | 8/1981 | Kennedy | |
| 5,062,446 A | 11/1991 | Anderson | |
| 5,684,245 A | 11/1997 | Hinkle | |
| 5,868,159 A | 2/1999 | Loan et al. | |
| 5,925,829 A | 7/1999 | Laragione et al. | |
| 6,216,726 B1 * | 4/2001 | Brown et al. | 137/486 |
| 6,363,958 B1 | 4/2002 | Ollivier | |
| 6,450,200 B1 * | 9/2002 | Ollivier | 137/624.12 |
| 6,948,508 B2 | 9/2005 | Shajii et al. | |
| 7,136,767 B2 | 11/2006 | Shajii et al. | |
| 7,204,158 B2 * | 4/2007 | Morgan et al. | 73/861.42 |
| 2009/0183549 A1 * | 7/2009 | Monkowski et al. | 73/1.35 |
| 2009/0266139 A1 * | 10/2009 | Gregor et al. | 73/1.16 |

OTHER PUBLICATIONS

International Search Report for PCT Application No. PCT/US2009/31170 dated Mar. 23, 2009.

* cited by examiner

*Primary Examiner*—Robert R Raevis
(74) *Attorney, Agent, or Firm*—Joseph Bach, Esq.; Nixon Peabody LLP.

(57) ABSTRACT

Methods and apparatus utilize a rate of drop in pressure upstream of a gas flow controller (GFC) to accurately measure a rate of flow through the GFC. Measurement of the gas flow through the many gas flow controllers in production use today is enabled, without requiring any special or sophisticated pressure regulators or other special components. Various provisions ensure that none of the changes in pressure that occur during or after the measurement perturb the constant flow of gas through the GFC under test.

4 Claims, 18 Drawing Sheets

METHOD AND APPARATUS FOR IN SITU TESTING OF GAS FLOW CONTROLLERS

REFERENCE TO RELATED APPLICATIONS

This application claims priority from U.S. Provisional Application Ser. No. 61/022,026, filed on Jan. 18, 2008, U.S. Provisional Application Ser. No. 61/080,196, filed on Jul. 11, 2008, and U.S. Provisional Application Ser. No. 61/090,147, filed on Aug. 19, 2008, the disclosure of all of which is incorporated herein by reference.

BACKGROUND

Certain industrial processes depend on well-controlled flows of gas. One example is in the field of semiconductor device manufacturing, which uses a wide variety of gases for processing silicon wafers into integrated circuits (ICs).

Plasma etching is a particularly important semiconductor process that depends upon carefully controlled flows of a number of different gases. In plasma etching, various gases are introduced into a vacuum chamber. Electrical power (typically in the form of radio frequency excitation) is used to ignite a plasma that creates reactive gas species. The reactive gas species etch patterns into the silicon wafer to define different components of the IC.

Because of the extremely small dimensions of the components of modern ICs, effective manufacturing requires the use of gas flows exhibiting very stable and consistent mass flow characteristics. Conventionally, such mass flow is measured in standard cubic centimeters per minute (sccm).

Typically however, the electro-mechanical mass flow controllers (MFCs) used to control the flows of gases, are prone to drift over time. Semiconductor fabrication processes are especially sensitive to these drifts, since variations as small as a few percent can severely degrade the performance of the integrated circuit. Accordingly, maintenance of stable gas flows may require frequent testing and calibration of the mass flow controllers.

Conventionally, testing of the MFCs is accomplished by introducing the gas into a vacuum chamber of a known volume, while monitoring the pressure within that chamber. Based upon the known correlation between pressure, volume, and the mass of the gas introduced (which defines the number of molecules of the gas), the rise in pressure ("rate of rise") as the gas flows into the vacuum chamber can be monitored. This information regarding pressure change within the chamber can then be used to determine the actual flow rate of gas through the mass flow controller.

For reasons of convenience, the vacuum chamber often used for the measurement of gas flows is the process chamber itself. The volume of the process chamber can be measured, for example, by monitoring a rise in pressure as gas is flowed through an MFC that is known to be accurate. Then, measurement of gas flow through any of the mass flow controllers connected to the process chamber can be readily accomplished.

One potential drawback of this conventional approach is loss in throughput of the process chamber. Specifically, the gas flow testing procedure consumes highly valuable time, during which no productive processing by the equipment can take place.

Another potential adverse consequence of this conventional approach is that deposits on the chamber walls from previous processing can serve to adsorb or desorb gases during the test. Where these deposits adsorb gases, the measured rate of the rise in pressure will be too low. Where the chamber deposits desorb gases, the rise in pressure will be too high. Either case will result in inaccuracies.

Moreover, even if there are no deposits present in the chamber, under certain conditions materials present on the walls of the chamber could adversely affect accuracy of the measurement. In one example, moisture on the walls of the chamber could react with a gas being flowed (such as silane), producing another gas (such as hydrogen) that throws off the pressure change and hence the flow rate calculation. In another example, ammonia bound to the chamber walls may react with $TiCl_4$ flowed into the chamber, throwing off a flow rate calculation.

Still another potential disadvantage to the conventional approach for measuring gas flows is that any change to the volume of the process chamber will require another measurement of the chamber volume. For example, the addition or removal of a component such as a pressure gauge, can change the volume of the chamber, thereby causing the flow rate calculated from the rate of rise of pressure to be incorrect.

Certain approaches have been proposed in the past to deal with some of these issues. For example, a separate volume can be positioned upstream of the process chamber, where the rate of rise measurement can take place. Since this volume will not have the types of deposits present in the process chamber and since this volume will not change by having components removed from it or added to it, some of the disadvantages cited above are not present. This method, however, still requires a separate step during which no productive processing can occur, and there is the possibility of the gas reacting with adsorbed species on the volume wall present from a previous gas. A refinement of this approach includes a heat conductive assembly inside the volume for maintaining a constant temperature as the gas flows into or out of the volume. In one approach the volume already present within the mass flow controller is used as the known volume, instead of a separate container.

Yet another approach allows measurement of the gas flow while the gas continues to flow as a normal part of its process. In this approach, a known volume and a valve are positioned upstream of a gas flow controller that is maintaining a constant gas flow. Closure of the valve while the gas flow controller is maintaining a constant gas flow creates a pressure drop in the volume, where the rate of the pressure drop is proportional to the gas flow rate.

Although this allows measurement simultaneous with the gas flow controller going about its normal production use, it is limited to those applications where the change in pressure does not influence the operation of the gas flow controller. To avoid this problem, a pressure regulator may be installed upstream of the gas flow controller (or, as described below, upstream of a flow restriction) and downstream of a known volume and a valve to interrupt the gas flow. One of the disadvantages of such a solution is that the requirements on this pressure regulator are so rigorous that standard pressure regulators will not be adequate in this role. Although the function of a pressure regulator is to keep the downstream pressure constant while the upstream pressure can take on any value higher than the downstream pressure, in reality the downstream pressure is influenced by the upstream pressure. In addition, most regulators have some amount of hysteresis. Any change in pressure downstream of the pressure regulator will create errors in the measurement of the gas flow; consequently, these systems require highly sophisticated pressure regulators to work effectively.

A sophisticated pressure regulator may actually be part of a mass flow controller, which is composed of the pressure regulator, pressure transducer, and a flow restrictor used as a critical orifice. In this case, it makes sense to use a known volume and a valve arrangement to test the gas flow rate, since the pressure regulator is already in place. Most gas flow controllers in production use, however, such as the many mass flow controllers used in the processing of silicon wafers, do not contain such a pressure regulator as part of their design. Consequently, to test these mass flow controllers would require the addition of this sophisticated pressure regulator.

It is undoubtedly a result of these significant disadvantages that, for example, the semiconductor industry, which has great need for testing its mass flow controllers, has made only extremely limited use of these approaches.

FIG. 1 shows an embodiment of an apparatus 100 representative of the prior art. (See, e.g., U.S. Pat. No. 4,285,245 and U.S. Pat. No. 6,363,958). The apparatus comprises a gas line 101 having an inlet 103 in fluid communication with a gas source 104, and an outlet 105 in fluid communication with either a flow restrictor or mass flow controller. The pressure regulator 102 is used to establish a constant pressure of the gas flowing to the flow restrictor or mass flow controller. Under standard process conditions, the valve 106 would be open and gas would be flowing through the pressure regulator to the flow restrictor or mass flow controller, and then ultimately into the process chamber.

In FIG. 1, the volume V 110, represents the total fixed volume inside the pipes and other components present between the valve 106 and the gas flow controller (GFC), where the GFC can be, for example, a flow restrictor or mass flow controller (MFC). A pressure transducer 112 is configured to measure the pressure in the volume V 110 immediately upstream of the pressure regulator 102.

The function of the pressure regulator 102 is to maintain a constant pressure downstream of the regulator regardless of the pressure upstream of the regulator (as long as the upstream pressure is equal to or larger than the downstream pressure). Under these conditions, there is no increase of decrease in the number of moles of gas between the pressure regulator and the flow restrictor or MFC. Consequently, the flow of gas out of the MFC or flow restrictor is equal to the flow of gas through the pressure regulator.

If valve 106 is closed, then since there is no gas entering or leaving the volume 110 from the left, any gas leaving the volume must flow through the pressure regulator 102, but since the flow through the pressure regulator is equal to the flow through the MFC or flow restrictor, the flow out of the volume is equal to the flow through the MFC or flow restrictor. Since the amount of gas leaving the volume 110 can be calculated from the rate of drop of pressure in the volume, such a calculation allows a determination of the flow rate through the flow restrictor or MFC.

Unfortunately, as Ollivier explains in U.S. Pat. No. 6,363,958, most pressure regulators cannot control the downstream pressure to the level of precision that is required for an effective implementation of this flow measurement system. If the downstream pressure is not sufficiently controlled, two significant errors can be introduced: (1) the flow of gas leaving the volume 110 will not be equal to the flow of gas through the MFC or flow restrictor, and (2) the flow of gas through the flow restrictor, which is proportional to the pressure upstream of the flow restrictor, will not be the desired value.

For further information the reader is directed to: U.S. Pat. No. 5,684,245 to Hinkle; U.S. Pat. No. 5,925,829 to Laragione, et al.; U.S. Pat. No. 6,948,508 and U.S. Pat. No. 7,136,767 to Shajii, et al.; U.S. Pat. No. 4,285,245 to Kennedy; and U.S. Pat. No. 6,363,958 to Ollivier.

From the above, it is seen that improved techniques for testing for gas flows through gas flow controllers are desired.

Preliminary, due to the multitude of arrangements discussed herein, it is helpful to define a convention when referring to various plumbing elements. As used herein, a valve is a plumbing element used to shut off or turn on the flow of fluid. The on/off actions may be manual or automatic using some control scheme. A metering valve is a plumbing element that is used to shut off and fully or partially turn on the flow of fluid. This is a similar metering valve to that used in home water plumbing, where the user may turn the flow to a desired level. The on/off and partial on actions may be manual or automatic using some control scheme. A pressure regulator is a plumbing element that automatically cuts off the flow of fluid at a certain pressure at its output. Pressure regulators react to the pressure on their output side, and close when the pressure in the plumbing reaches the designated level. Should the pressure come down (for example, if someone were to open a faucet, i.e., open a metering valve downstream of the regulator), the regulator then opens and allows flow until the pressure is brought back up to its desired level, which is typically referred to as the set point. A typical pressure regulator uses the outside air, i.e., atmosphere, as a reference to bring the output (i.e., downstream) pressure to the desired set point. It regulates not on the pressure difference between the inlet and outlet, but rather the pressure difference between the outlet and the atmosphere.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the present invention employ a rate of drop in pressure upstream of a GFC to accurately measure a rate of flow through the GFC; however, in contrast to the prior art, these embodiments allow measurement of the gas flow through the many gas flow controllers in production use today, without requiring any special or sophisticated pressure regulators or other special components. According to one embodiment, the timing of the closure of the valve is chosen such that none of the changes in pressure that occur during or after the measurement perturb the constant flow of gas through the GFC under test.

In another embodiment, the rise in pressure after the valve is reopened is controlled such that the constant flow of gas through the gas flow controller is not perturbed or not perturbed beyond a set level, e.g., 10%, 5% or 1%.

According to yet another embodiment, which allows direct insertion into the gas panels of existing semiconductor and related process tools and allows continuous operation of the GFC without recharging any volume, prior to measuring the flow of gas through the GFC, the set point of a standard pressure regulator upstream of the volume and GFC is momentarily increased. A drop in the pressure then reveals the accurate rate of flow of the gas through the GFC.

In yet another embodiment, the gas flow controller under test is replaced by a control valve that is in closed loop control with the measurement of the drop in pressure, such that the drop in pressure, and consequently the flow, is kept at a desired level.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 3 shows the timing of the pressure drop and rise for one implementation of the embodiment shown in FIG. 2, while

DETAILED DESCRIPTION

Figure 2:
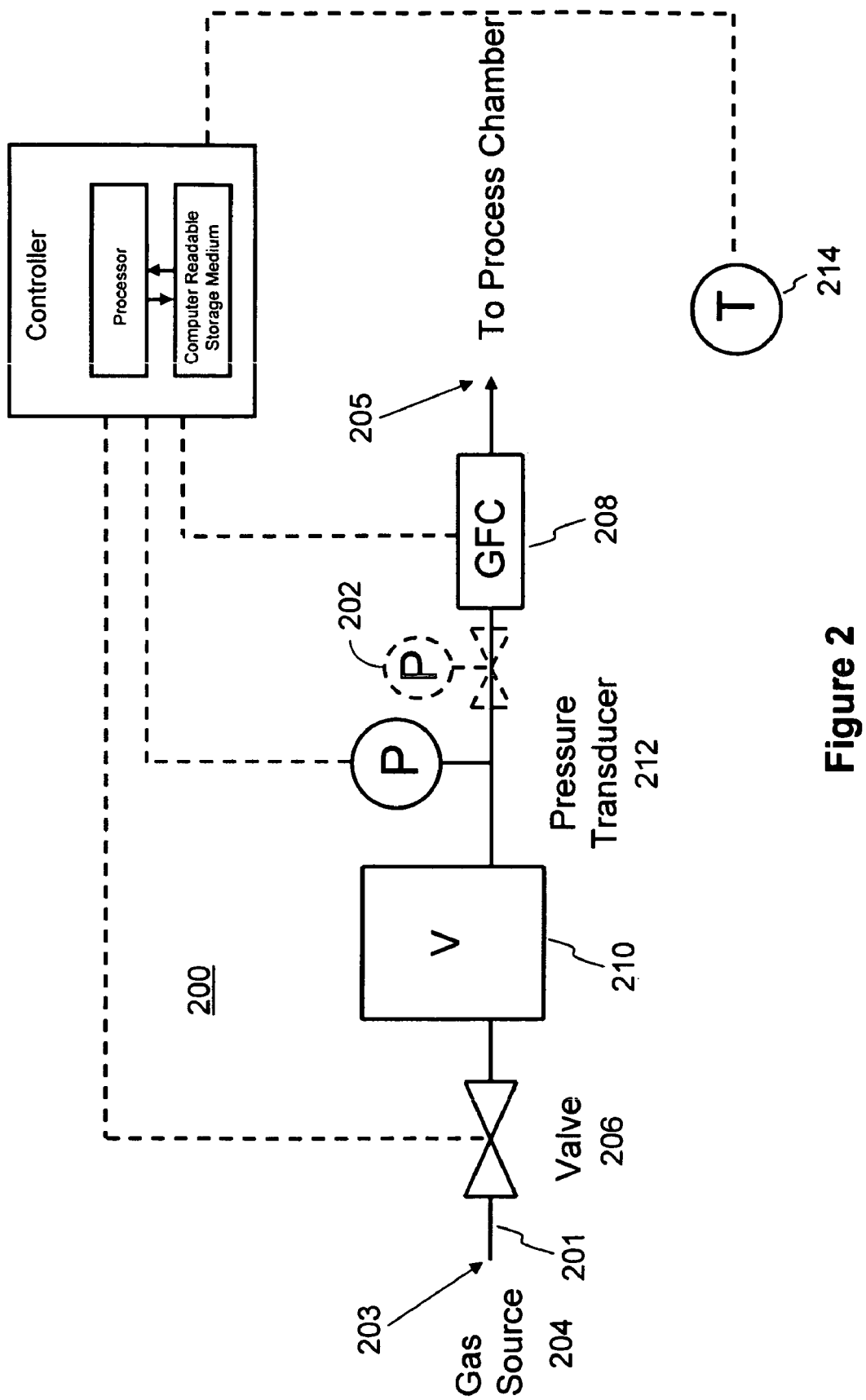
FIG. 2 is a simplified schematic diagram of an embodiment of an apparatus in accordance with the present invention for testing gas flow controllers.

FIG. 2 shows an embodiment of an apparatus 200 for use in accordance with the present invention. The apparatus comprises a gas line 201 having an inlet 203 in fluid communication with a gas source 204, and an outlet 205 in fluid communication with a process chamber (not shown). Under standard process conditions, the valve 206 would be open and gas would be flowing through the volume 210 to the gas flow controller (GFC) 208, and then ultimately into the process chamber.

The GFC, which establishes the desired flow rate of gas to the process chamber, can be any one of several types of flow controllers typically employed in the semiconductor industry or in other fields. Most commonly, the GFC is a mass flow controller (MFC). Alternatively, the GFC can be a volumetric flow controller.

In FIG. 2, the volume V 210, represents the total fixed volume inside the pipes and other components present between the valve 206 and the GFC 208. A pressure transducer 212 is configured to measure the pressure in the volume V 210 immediately upstream of the GFC.

A temperature sensor 214 is positioned to measure the temperature in the vicinity of the components. In certain embodiments, the sensor 214 may be a specialized sensor in direct thermal communication with one or more components. However, since typical semiconductor fabrication facilities are temperature-controlled, it is not expected that the temperature will vary greatly from place to place or time to time. Consequently, in other embodiments, a thermometer positioned near the gas delivery system will provide sufficient information regarding the temperature of interest.

The procedure for testing the flow of gas through the GFC may be summarized in the process flow 250 of FIG. 2A as follows.

1. In step 252, the GFC is set to a desired flow rate, and a flow of gas is established.

2. In step 254, the valve 206 is closed.

3. In step 256, the pressure is measured at regular periods, typically every second or fraction of a second, by the pressure transducer 212 over a defined period of time, typically ranging from several seconds to several minutes.

4. After the pressure has dropped by some amount (typically 5-30% of the starting value), in step 258 the valve 206 is opened, and the testing procedure concluded.

5. In step 260, the temperature in the vicinity of the components shown in FIG. 2 is noted.

There is some amount of flexibility in the ordering of these steps; for example, steps 1 and 2 can be interchanged. Step 5 can be done at any time during the testing procedure. In general, both for this procedure and others described below, this type of flexibility may be present.

According to the ideal gas equation, the amount of gas in the volume V 210, is given by:

$$n = PV/RT, \text{where} \quad \text{Equation (1)}$$

n=amount of gas (measured in moles)

P=pressure measured by the pressure transducer

V=volume of gas

R=ideal gas constant=1.987 calories per mol per K

T=absolute temperature in K.

To some extent, all real gases are non-ideal. For these non-ideal gases, Equation (1) can be rewritten as:

$$n = PV/ZRT, \text{where} \quad \text{Equation (2)}$$

Z=compressibility factor.

The compressibility factor may be determined from experimental measurements for any particular gas, and is a function of temperature and pressure.

The flow rate of a gas can be written as the change in the amount of gas per unit time; i.e.:

$$\text{flow rate} = \Delta n/\Delta t, \text{where} \quad \text{Equation (3)}$$

t=time.

Substituting into Equation (3) from Equation (2), yields:

$$\text{flow rate} = (\Delta P/\Delta t)V/ZRT. \quad \text{Equation (4)}$$

The first factor ($\Delta P/\Delta t$) is merely the slope of the pressure measurements as a function of time taken in step 3 of the procedure above. Thus, taking these pressure measurements in conjunction with the volume, temperature, and the compressibility factor (which can be found in various handbooks), the actual rate of flow of the gas through the GFC can be determined according to embodiments of the present invention.

While the above description relates to accurate calculation of an actual magnitude of flow rate from a pressure drop, this is not required by the present invention. In accordance with alternative embodiments, a relative change in flow rate may be determined based upon a comparison of different pressure drop measurements.

For example, in certain embodiments two sets of pressure drop measurements may be taken to provide a relative measure of changed flow rate. In one embodiment, the first measurement may be taken from the GFC that is to be tested, with the second measurement taken from a GFC of known performance. A difference between the two pressure drop readings could reveal deviation of flow rate by the tested device, without determination of the actual flow rate.

In an alternative embodiment, a first pressure drop measurement may be taken at a first time with the GFC that is to be tested, with the second pressure drop measurement being taken from that GFC at a second time. Again, a difference between the two pressure drop measurements readings could reveal the magnitude of change (drift) in the flow rate from the tested device, over time.

Figure 1:
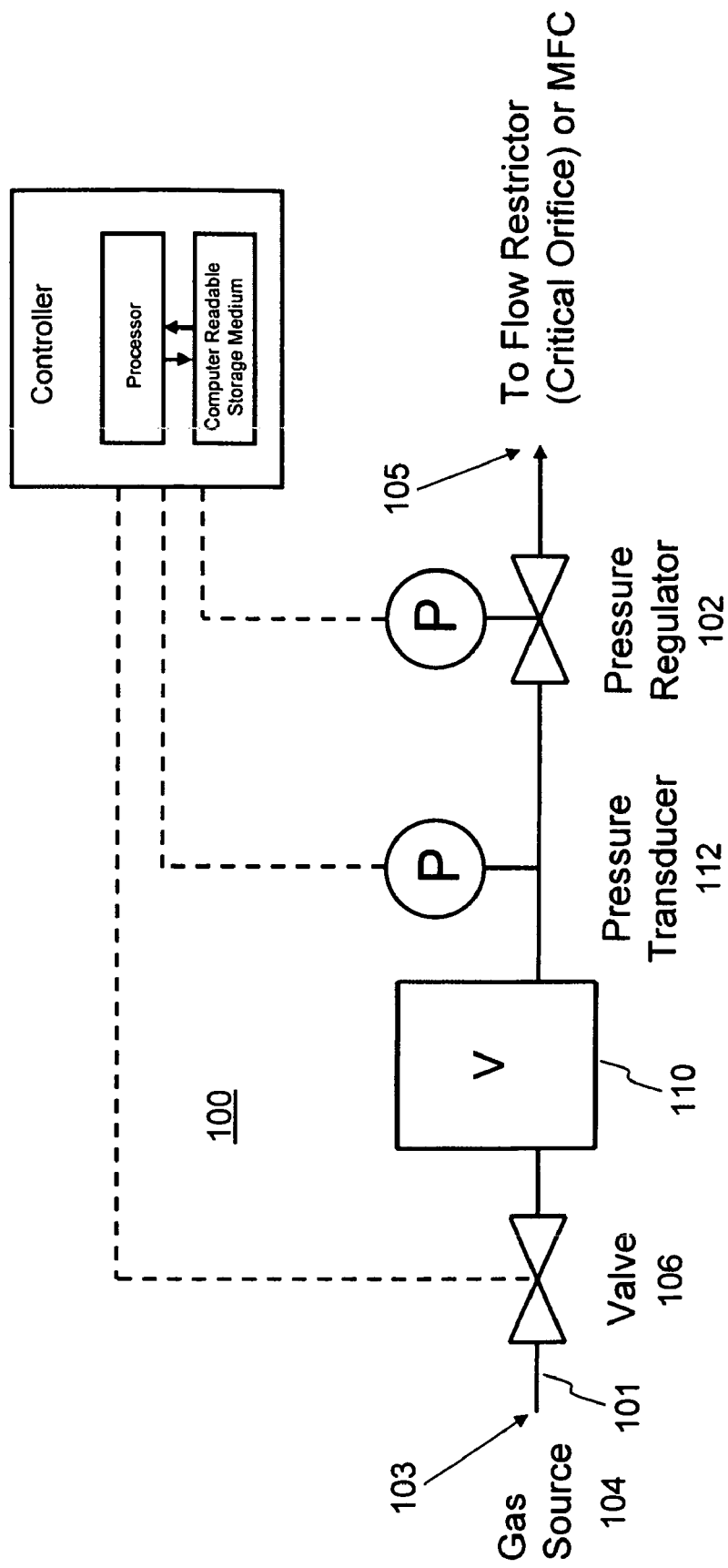
FIG. 1 is a simplified schematic diagram of the prior art.

One or more steps of the various embodiments of the present invention could be performed with manual or automatic operation. For example, the steps of opening/closing valves and taking pressure readings could be conducted automatically according to computer control. Alternatively, one or more of the various valves could be actuated manually, with the resulting flow rate calculated automatically from the detected pressure drop. Automatic operation of one or more steps could be accomplished based upon instructions stored in a computer readable storage medium, utilizing communication through control lines as indicated in FIGS. 1 and 2.

Another benefit of this measurement system is that if a discrepancy is found between the desired flow rate and the measured flow rate, the setting of the GFC could be changed to correct for the discrepancy and provide the desired flow rate. This correction could be done in the same process step or in a subsequent process step. This type of correction is greatly simplified if the system is under computer control.

Many gas flow controllers, particularly the MFCs used in the semiconductor industry, can accommodate slow changes in upstream pressure while still maintaining a constant flow rate; however, if the pressure changes too abruptly, they will exhibit deviations from the desired flow rate. In the embodiment of FIG. 2, the rate of change in pressure during the time that valve 206 is closed is sufficiently small to keep from disrupting the flow through typical MFCs. On the other hand, when valve 206 is opened, the rapid rise in pressure will invariably create significant perturbations in the flow rate through the MFC. An example of these perturbations is shown in FIG. 2C, where the opening of the valve at approximately 57 seconds creates a rise in the flow rate from 50 sccm to over 70 sccm, followed by a drop to 40 sccm, before settling back at the desired 50 sccm. Consequently, in one of the implementations of the embodiment of FIG. 2, the timing of the closure and opening of valve 206 is chosen such that the opening does not occur during the actual process step.

Figures 2A, 2B:
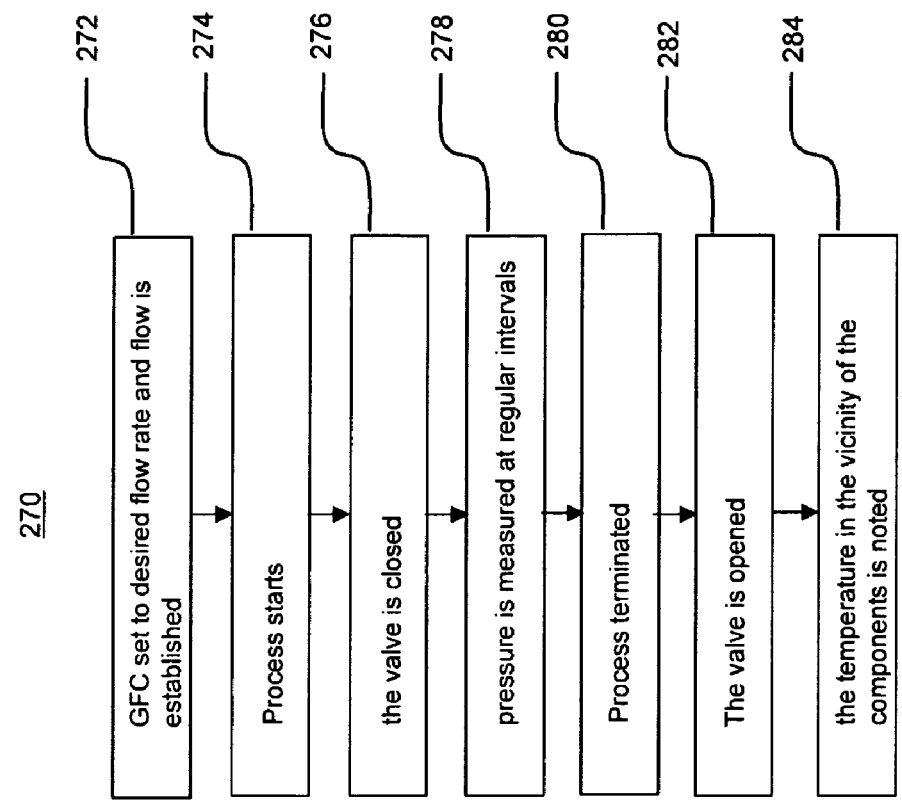
FIG. 2A is a simplified diagram illustrating a flow of steps performed according to the embodiment of FIG. 2.
FIG. 2B illustrates a flow chart of one possible method for timing the closure and opening the valve according to an embodiment of the invention.
Figure 2C:
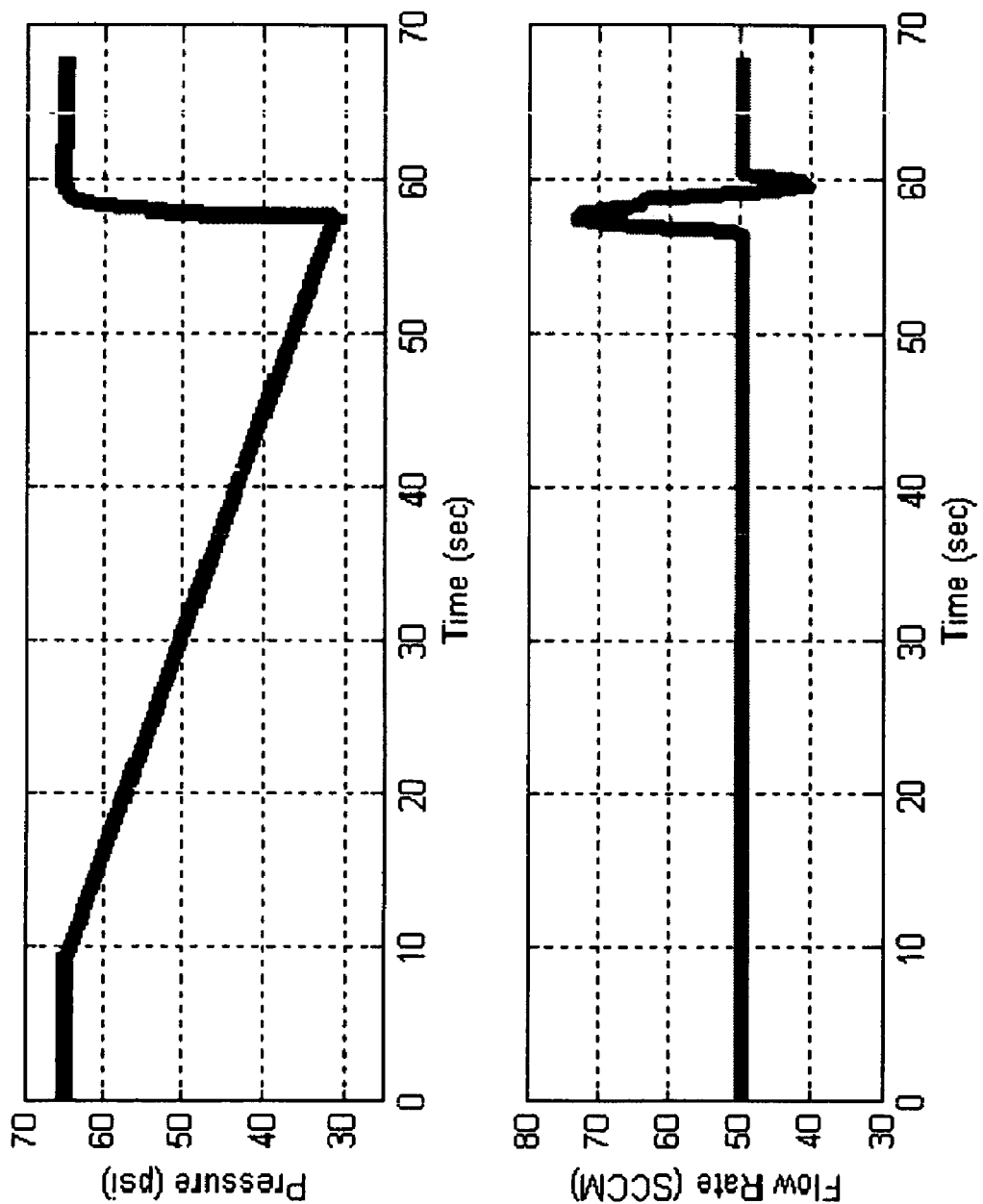
FIG. 2C shows the rise in pressure and the perturbation in the flow of gas through the gas flow controller when the valve that is used to interrupt the gas flow is opened.
Figure 3A:
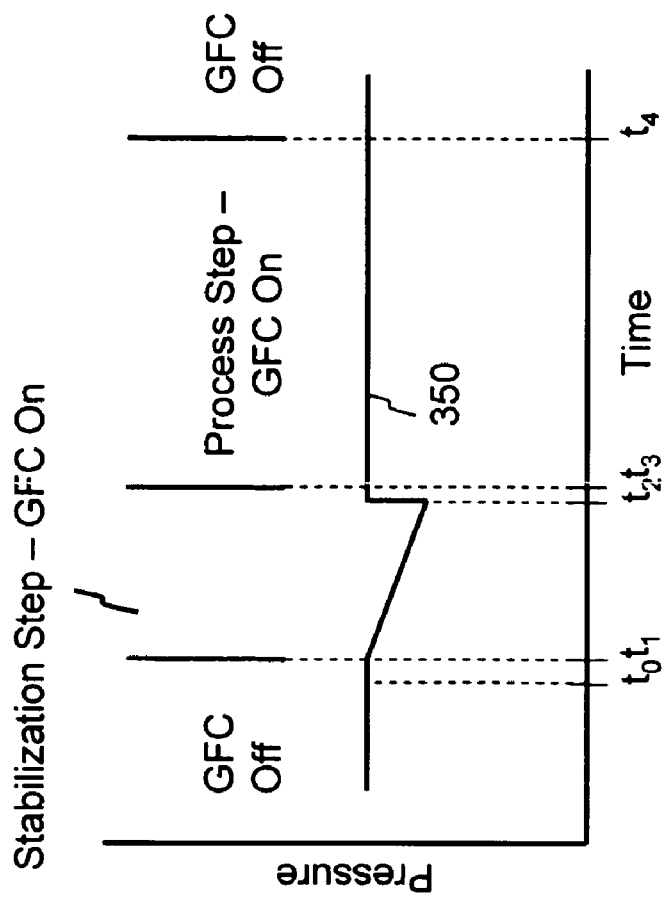
FIG. 3A shows the timing of the pressure drop and rise for another implementation of the embodiment shown in FIG. 2.
Figure 3:
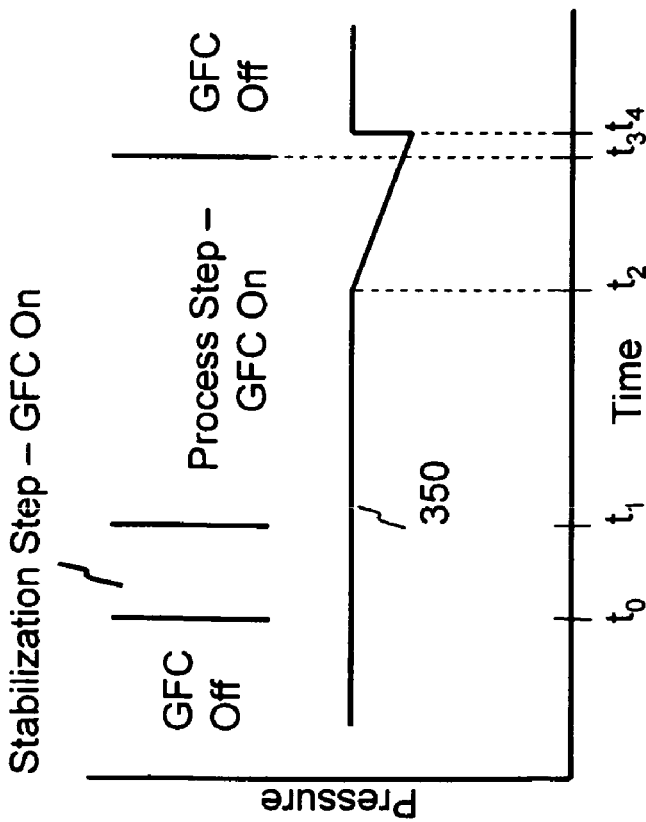

FIG. 2B illustrates a flow chart of one possible method for timing the closure and opening the valve, while FIG. 3 shows a timing chart for the closure and opening of valve 206. The pressure is shown by trace 350. At time $t_0$, step 272, the GFC is turned on; however, there frequently is a stabilization step during which time the GFC as well as other components on the process tool take on their desired values. At time $t_1$, step 274, the processing in the fabrication or processing chamber begins. It is at this time, for example, that the RF power during a plasma etch or deposition process would be turned on. As mentioned above, there is no problem with the closure of valve 206 taking place during the processing, and such a closure occurs at time $t_2$, step 276. At step 278 pressure is measured at regular intervals to enable calculating the flow rate. At time $t_3$, step 280, the processing in the fabrication chamber ends and, thereafter, at time $t_4$, step 282, the valve 206 is opened. Optionally, at step 284 the temperature is noted.

It is important to note that the closure of the valve at step 276 is timed such that the opening of the valve, which takes place at time $t_4$, step 282, occurs after time $t_3$, step 280, the end of the process step. In this way, the GFC is not perturbed by the rapid rise in pressure. This may be achieved by first recording the total time needed for the process and the total time needed for the pressure drop measurement. For example, if processing takes 30 seconds and measurements takes 10 seconds, then the valve may be closed 21 seconds after the start of the process and re-opened 31 seconds after the start of the process, ensuring that the valve is re-opened after process is completed. Of course, this determination can be done once beforehand and utilized for all runs of the process.

Alternatively, measurement of the flow rate could be carried out during the stabilization step, with the opening of valve 206 taking place prior to the beginning of the process step. In this case, the closure of the valve could actually take place prior to the stabilization step beginning. This is illustrated in FIG. 3A. At time $t_0$ the valve is closed; however, since the GFC is also closed, pressure is not dropping. At time $t_1$ the GFC is opened for the stabilization step, and pressure begins to drop, so measurements may be taken during this period. At time $t_2$, which is still during the stabilization step, the valve is opened so that the pressure returns to the set point. At time $t_3$ the processing in the fabrication chamber begins and at time $t_4$ the processing ends. No measurements are taken during the time period between time $t_3$ and time $t_4$.

If the measurement is carried out during the stabilization step as shown in FIG. 3A, any correction of flow rate could be implemented for the current process step, whereas if the measurement is carried out at the end of the process step as shown in FIG. 3, only the subsequent step could be corrected. This is not a significant drawback, however, since most drifts in gas flow controllers, especially the MFCs used in the semiconductor industry, occur over a period of time that encompasses many process steps.

Figure 4:
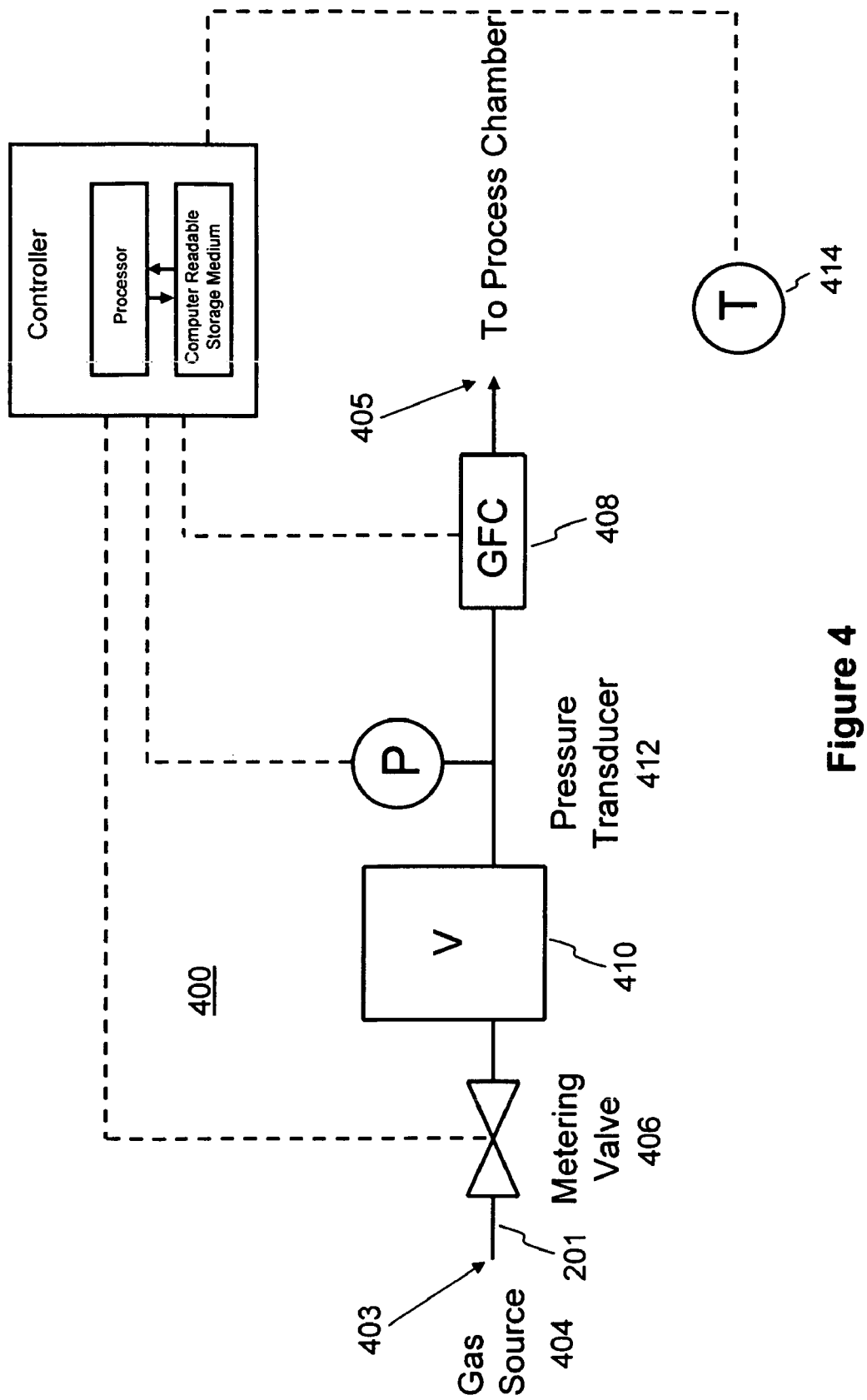
FIG. 4 is a simplified schematic diagram of an embodiment of an apparatus in accordance with the present invention for testing gas flow controllers, where the rate of rise in pressure is controlled to a certain value.

FIG. 4 shows another embodiment, similar to that of FIG. 2; however, with the shutoff valve 206 replaced by metering valve 406, which is a valve designed to provide varying gas flow rates over a range of settings. That is, while shutoff valve 206 is a simple on/off valve, the amount of opening and closure of metering valve 406 can be controlled to generate different flow rates through the valve. That is, in this embodiment, when metering valve 406 is opened at the end of the measurement period, the controller controls the amount of valve opening such that the rise in pressure, as determined with pressure transducer 412, is maintained at a certain rate that is sufficiently low so that the flow through the GFC is not perturbed. In other words, the opening of metering valve 406 is performed gradually rather than abruptly, so that the GFC is not perturbed. Alternatively, rather than raising the pressure at all during the process step, the pressure could be held constant at the end of the measurement period and then raised once the process step was terminated. This approach would have the least effect on any perturbation of the GFC flow rate. An example is shown in FIG. 4B, where it is seen that there is no observable deviation in the flow rate during either the drop in pressure or the transition to a constant pressure.

Figure 4A:
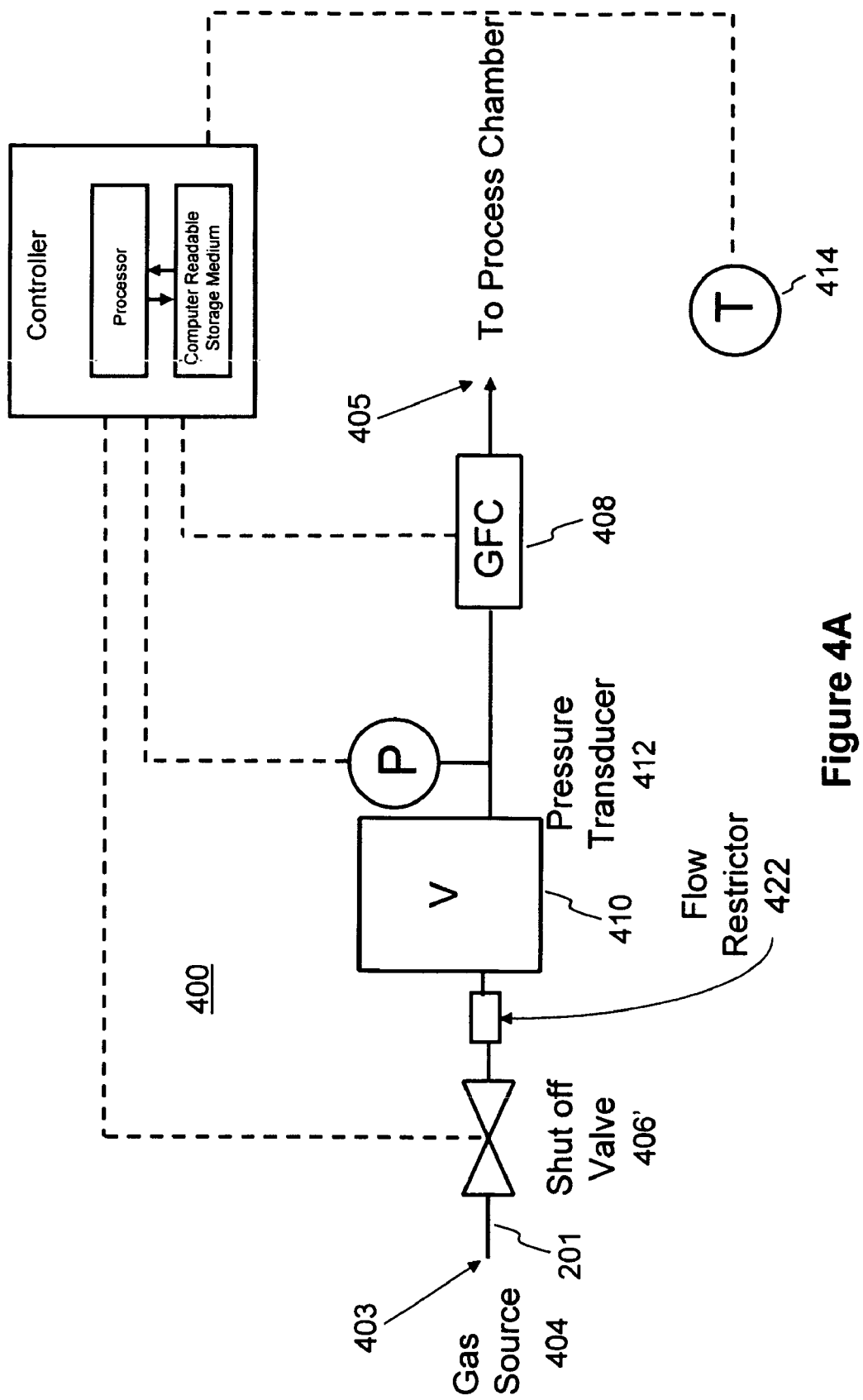
FIG. 4A is a simplified schematic diagram of another embodiment of an apparatus in accordance with the present invention for testing gas flow controllers, where the rate of rise in pressure is controlled to a certain value.
Figure 4B:
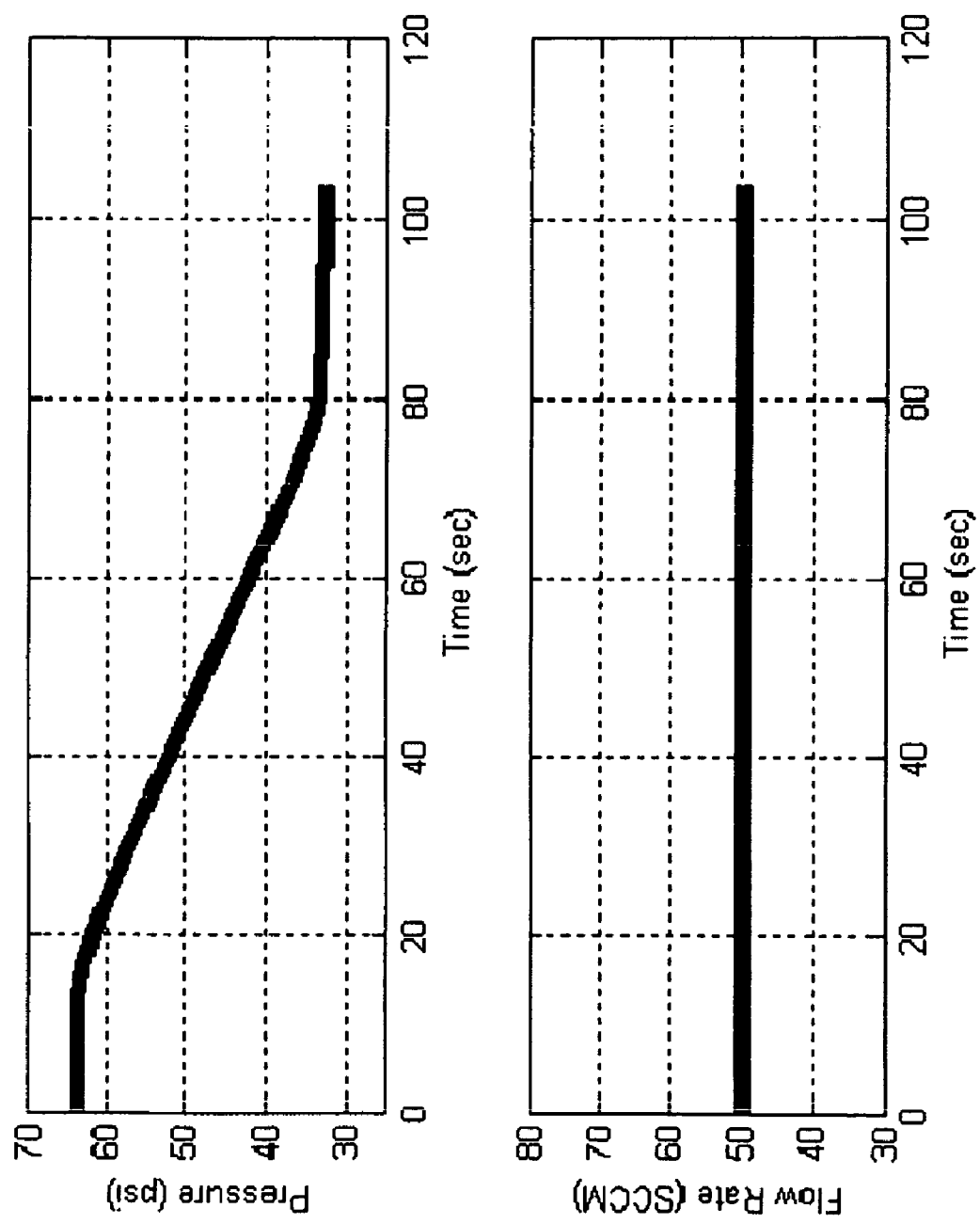
FIG. 4B shows the control of pressure and the lack of perturbation of the flow of gas through the gas flow controller when the gas flow into the volume is controlled in accordance with the present invention.

In yet another embodiment shown in FIG. 4A, valve 406' remains a shutoff valve, but a flow restrictor 422 is placed in series with valve 406' such that when the valve is opened, the flow into the volume 410 is restricted to a value that keeps the rate of rise in pressure to a sufficiently low value. Consequently, even if the valve 406' is opened abruptly, the pressure increase is gradual due to the flow restrictor 422. In this case, it is important to make sure that the flow rate that the restrictor allows is higher than the highest flow rate of the GFC.

Although the above embodiments are completely effective in achieving the desired objective of measuring gas flow rates in standard industrial processes, such as semiconductor manufacturing, without the addition of sophisticated pressure regulators, they still require the addition of a controlled valve upstream of the volume and they require some level of control of either the timing of when the valve is opened or rate of pressure rise when the valve is opened.

Figure 5:
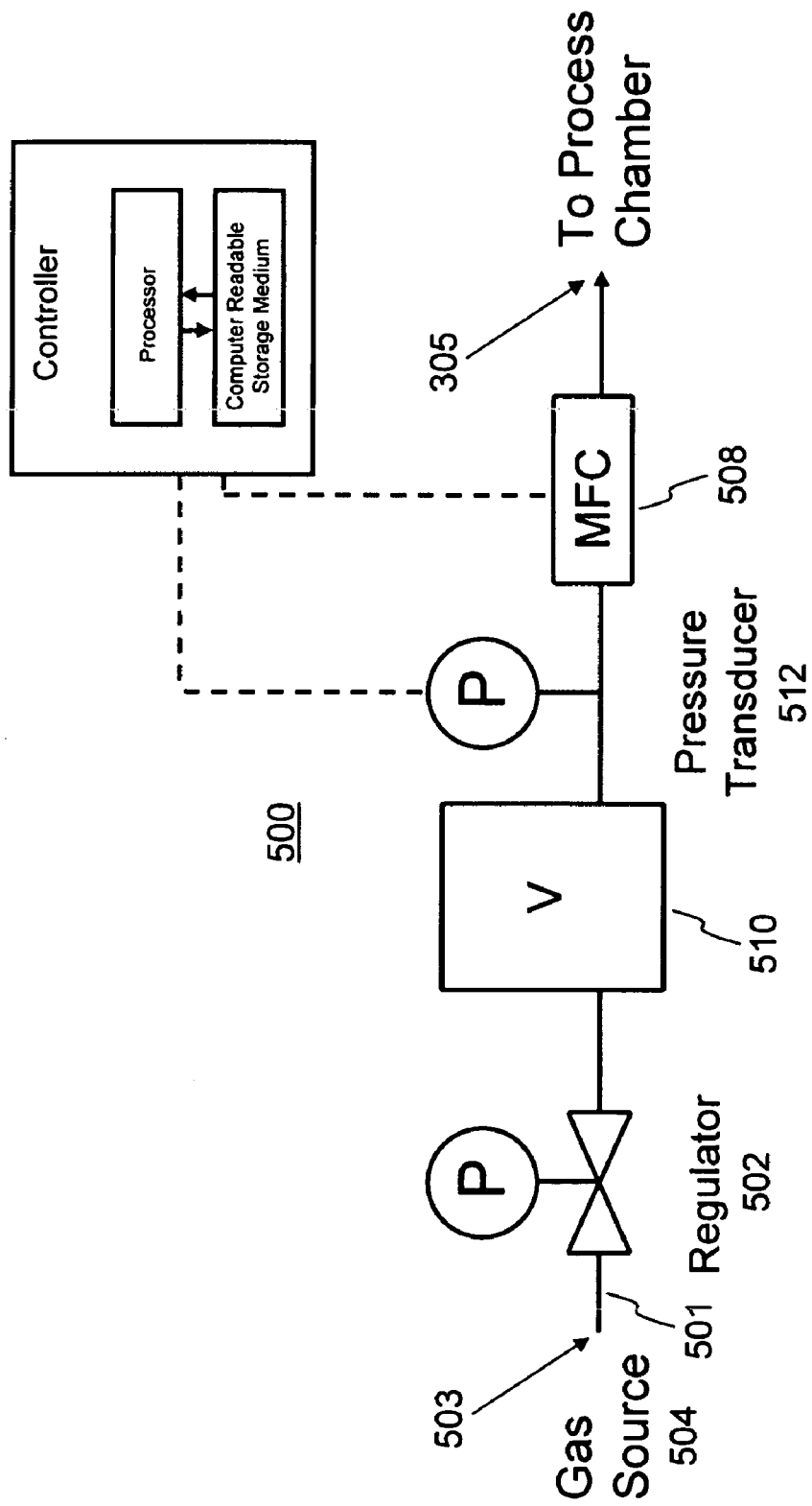
FIG. 5 is a simplified schematic diagram of a typical gas delivery system used in the semiconductor and related industries.

FIG. 5 shows the typical configuration of almost all gas delivery systems used in the semiconductor and related industries. There will most likely be some additional components, such as a manual safety shutoff valve to the left of the pressure regulator and/or a shutoff valve before and/or after the MFC; however, FIG. 5 shows the major components relevant to the present discussion. In this figure, the pressure regulator 502 is a standard pressure regulator, which possesses some amount of hysteresis and some amount of influence of upstream pressure on downstream pressure control.

Especially in the semiconductor and related industries, where gas purity is critical, there is a great reluctance to change any plumbing in the gas delivery systems. Certainly this is true for already installed systems, but it is also true for new systems being built. Almost all of the new systems being designed and built are identical to FIG. 5. This is not to say, though, that components are never changed. In fact, the gas delivery systems are designed to allow replacement of valves, pressure regulators, MFCs, etc.; they just do not allow addition of any components. Consequently, implementing the embodiments shown in FIG. 1, 2, or 4 would be difficult in the semiconductor and related industries.

Figure 6:
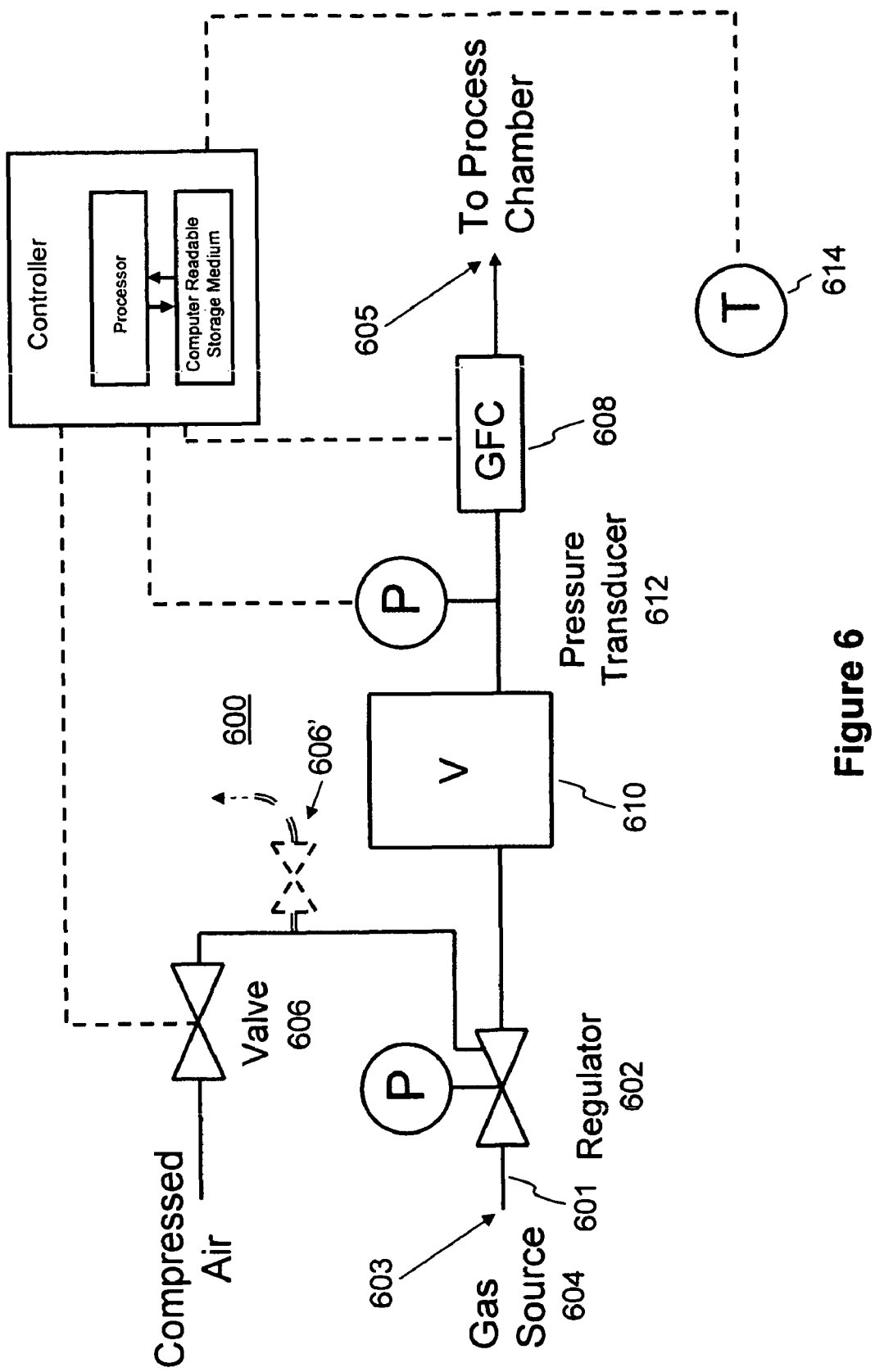
FIG. 6 is a simplified schematic diagram of an embodiment of an apparatus in accordance with the present invention for testing gas flow controllers that allows direct insertion into existing semiconductor and related gas delivery systems.

FIG. 6 shows an embodiment of the present invention that allows direct insertion into existing semiconductor and related gas delivery systems. This embodiment takes advantage of the fact that many regulators in current use have a rarely exploited configuration that allows an increase in set point to take place by increasing the pressure above the pressure regulator's diaphragm. Normally, the volume above the diaphragm is exposed to atmosphere; however, by increasing the pressure in this volume to a level above atmospheric pressure, the regulated pressure also rises. In the embodiment of FIG. 6, this increase in pressure is achieved by the addition of valve 606, that may be controlled to deliver a prescribed amount of compressed air or other compressed gas, such as nitrogen, to the top-side of the regulator 602, hereby controlling the set point of regulator 602. Since the compressed air is delivered to the top-side of regulator 602, the air does not mix with the gas delivered to the process chamber.

Whereas the embodiments in FIGS. 2 and 4 use a fixed volume defined by the closure of a valve (206 or 406), the embodiment in FIG. 6 does not use a valve. Rather, the embodiment of FIG. 6 uses the flow vs. pressure relationship of the pressure regulator to create the conditions required for the present invention. Significantly, these conditions exist only while the pressure downstream of the pressure regulator is larger than the pressure that under normal circumstances would be established by the regulator.

Although one would not consider an upstream pressure regulator to be defining a fixed volume, i.e., acting as a valve, for the purposes of the present invention, the important property of the regulator is that, during the measurement of the flow of gas through the GFC, there is no flow of gas in either direction through the regulator. According to the behavior of a pressure regulator, as long as the pressure of the gas downstream of the regulator is no lower than the pressure to which it is set, it will not allow any flow of gas to the downstream side of the regulator. In addition, even if the pressure of the gas downstream of the regulator is higher than the pressure that it is set to establish, there is no capability of the regulator that would allow it to flow gas from the downstream side to the upstream side. Since there is no gas flowing in either direction through the regulator under these conditions, it satisfies the conditions required for measurement of the gas flow through the GFC according to the present invention.

It should be noted that in FIG. 6 a key advantage of this embodiment is that only pressure regulator 602, volume 610, pressure transducer 612, and GFC 608 are part of the high purity gas delivery system. Significantly, these are the same conventional components shown in FIG. 5. The valve 606 is outside the high purity gas delivery system, and is similar to the valves that supply the compressed air or other gas for actuation of various pneumatic valves in the fabrication system. As such, it is easily added to the gas delivery system. It should also be noted that if for any reason the actual pressure regulator or pressure transducer required for the present invention is different from that already existing in the system, these components can be easily changed out. In addition, if the volume of the existing system is not as large as desired, a specially fabricated volume that also includes a pressure transducer could be inserted in place of the currently existing pressure transducer.

Another key advantage of the embodiment shown in FIG. 6 is that since there is no fixed volume closed off by a valve, the supply of gas is not limited as it is, for example, in the embodiments of FIGS. 2 and 4.

The procedure for testing the flow of gas through the GFC may be summarized in the process flow 650 of FIG. 6A as follows.

1. In step 652, the GFC is set to a desired flow rate, and a flow of gas is established.

2. In step 654, the valve 606 is opened.

3. In step 656, the valve is closed after establishing a predetermined pressure downstream of regulator 602. This pressure could be measured by pressure transducer 612, and valve 606 controlled accordingly by the system controller, or alternatively, the pressure of the gas being delivered by valve 606 could be maintained at a certain pressure that provides exactly the right pressure rise in the volume 610 when valve 606 is opened for a sufficient time and then closed. At the time valve 606 is closed, or immediately thereafter, the set point of regulator 602 is returned to its normal value (i.e., its value prior to step 2). This can be done by the proper selection of valve 606 (e.g., using a 3-way valve) or by the addition of valve 606' that opens to the atmosphere, which allows the pressure above the diaphragm of the regulator to return to atmosphere.

At the point when the valve 606 is closed and the set point returns to its normal value, since the pressure downstream of the regulator 602 is higher than its set point, regulator 602 shuts off and no fluid flows downstream of regulator 602. However, since processing in the chamber continues and consumes fluid from the plumbing downstream of regulator 602, the pressure in volume 610 starts to decrease.

4. In step 658, while processing in the chamber proceeds, the pressure is measured at regular periods, typically every second or fraction of a second, by the pressure transducer 612 over a defined period of time, typically ranging from several seconds to several minutes.

5. After the pressure has dropped by some amount (typically 5-30% of the starting value), and before the pressure decreases to the set point of the pressure regulator, the testing procedure is concluded.

6. In step 660, the temperature in the vicinity of the components shown in FIG. 6 is noted.

The flow rate of the GFC for this embodiment is calculated in a manner identical to that of the embodiment of FIG. 2, and is consequently given by Equation (4).

It is not critical that the GFC be set to the desired flow rate prior to opening and closing the valve 606. In fact, the GFC could be set to the desired flow rate after the valve 606 is opened, but before it is closed, or it could be set to the desired flow rate after the valve has been both opened and closed.

Although FIG. 6 shows one specific embodiment for controlling the rise in pressure as effected by the pressure regulator, any approach that will momentarily increase the pressure downstream of the pressure regulator will be adequate. What is required is that the measurement is taken place after the pressure in the volume upstream of the GFC has been increased to above the normal set point, so that as gas is delivered to the chamber the pressure is reduced towards the normal pressure so that perturbations on the GFC are avoided. Also, while the normal set point is assumed to be that produced by atmospheric pressure above the diaphragm, this is not necessary. What is required is that the opening of valve 606 would raise the set point of regulator 602 to a pressure higher than its normal set point.

Figures 6A, 7A:
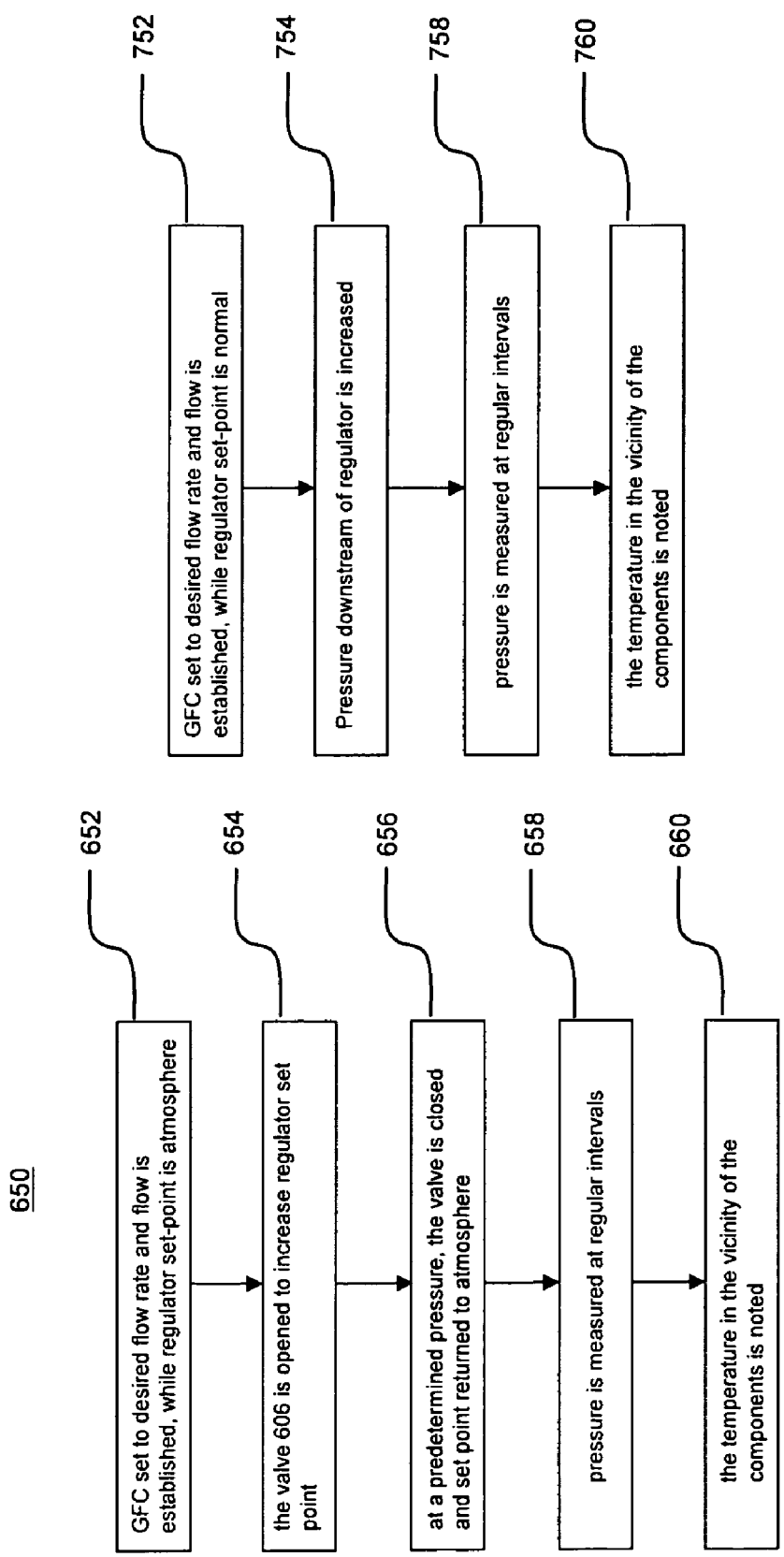
FIG. 6A is a simplified diagram illustrating a flow of steps performed according to the embodiment of FIG. 6.
FIG. 7A illustrates the process in its general form.
Figure 7:
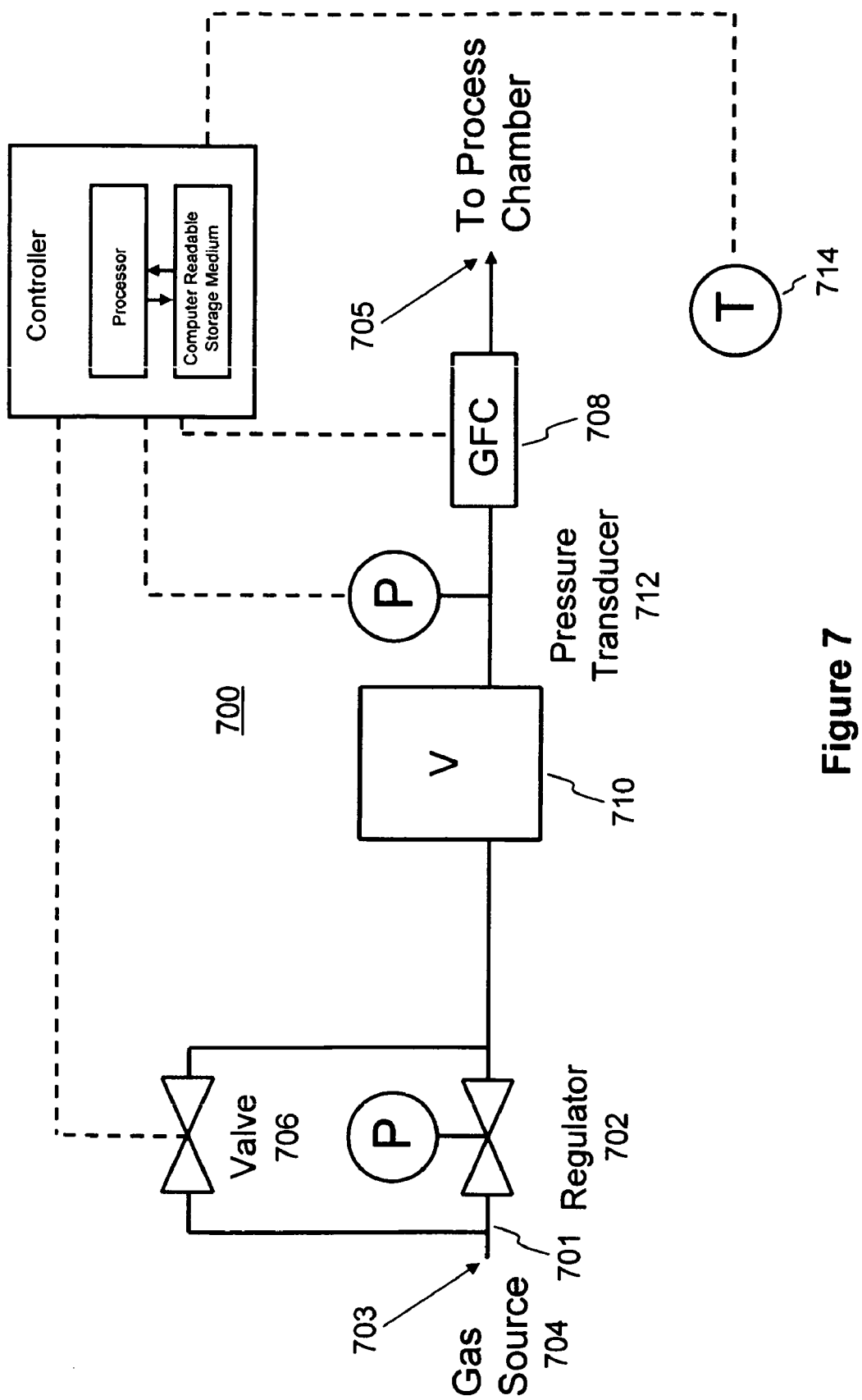
FIG. 7 is a simplified schematic diagram of an alternative embodiment to that in FIG. 6.

FIG. 7 is a simplified schematic diagram of an alternative embodiment to that in FIG. 6. The embodiment of FIG. 7, utilizes the standard regulator 702, volume 710, transducer 712 and GFC 708, but adds a bypass valve 706 in parallel with the pressure regulator 702. As can be understood, in normal operation the pressure in line 701 upstream of the regulator 702 is higher than the pressure downstream of the regulator. Bypass valve 706 enables increasing the pressure downstream of regulator 702, beyond the set point of the regulator 702. This creates a similar effect as that of the embodiment of FIG. 6. Of course, in this case the additional bypass valve 706 is part of the high purity gas delivery system and needs to comply with cleanliness standards of the system.

The operation of the embodiment of FIG. 7 is similar to that of FIG. 6. That is, the steps would mimic that of FIG. 6, except that rather than operating the air pressure valve, in the embodiment of FIG. 7 the bypass valve 706 is opened to increase the pressure downstream of regulator 702, and is then closed. In this condition, gas will not flow through the regulator 702 until the pressure downstream would be reduced below the set point of the regulator 702. The measurement is performed during the period after closing the valve 706 and prior to the pressure downstream reaching the set point of regulator 702.

Stated another way, in both the embodiments of FIG. 6 and FIG. 7, the pressure downstream of the regulator is elevated in order to perform the measurement. In FIG. 6 the pressure is elevated "indirectly," in that the set point of the regulator is elevated to cause the regulator to allow flow and establish a downstream pressure that is higher than the normal set point. On the other hand, in FIG. 7 the pressure is elevated "directly" by by-passing the regulator. However, from the testing view the results are the same.

Thus, FIG. 7A illustrates the process in its general form. In step 752 the flow of the GFC is established while the regulator is set to its standard set point. At step 754 the pressure downstream of the regulator is increased. Note that the order of steps 752 and 754 can be reversed. At step 758, while processing in the chamber proceeds, the pressure downstream of the regulator is measured at intervals. Also, at step 760, which can be done at any time, the temperature is measured. The flow is calculated using the pressure measurements taken in step 758.

One of the simplest ways to use the embodiment of FIG. 6 or 7 is to use the compressed air (or any other compressed gas, such as nitrogen) of FIG. 6 or the bypass flow of process gas through Valve 706 of FIG. 7 to increase the pressure downstream of the pressure regulator to a certain value and then during the operation of the GFC, allow the pressure to decrease to the normal set point of the regulator. With this approach, for all but the highest GFC flows, the pressure will still be decreasing after the flow rate measurement has been made. For optimum operation of the GFC, it might be desirable to attain a steady pressure upstream of the GFC as quickly as possible. In such a case, this pressure could be controlled in such a way that as soon as the flow measurement is made, the pressure is held constant for the remainder of the process step.

If one knew, a priori, the flow rate to which the GFC was set, one could raise the starting pressure to just the right value such that immediately after the flow rate measurement was made, the pressure would be at the normal set point pressure of the regulator. More likely, however, is that the flow rate of the GFC will not be known ahead of time. In this case, it would be preferable to keep the starting pressure the same each time, but control the pressure at the end of the measurement. This can be done with the embodiment of FIG. 6 by controlling the compressed air or other gas to effectively increase the set point of the pressure regulator to the pressure that exists at the end of the flow rate measurement and holding that effective set point for the entire process step.

It should also be noted that whereas FIG. 6 shows an embodiment with control of the regulator being carried out with the use of compressed air of other gas, one could envision other electromechanical means by which the effective set point of the regulator could be controlled.

Yet another approach to achieve the well controlled timing for the pressure drop as described above is to use the embodiment shown in FIG. 4, with the metering valve 406 in closed-loop control with the pressure transducer 412. To carry out the flow rate measurement, the metering valve 406 would be closed; however, rather than using the metering valve to bring the pressure back to the starting point after the conclusion of the measurement, one could control the opening of the valve such that the pressure downstream of the valve was maintained at a constant value, e.g., the value of the pressure immediately after the flow rate measurement was made. If the metering valve was used in this manner, it could take the place of the pressure regulator 602 in FIG. 6, and could also be easily retrofit into existing gas delivery systems.

Although a benefit of the embodiments of FIGS. 4, 6 and 7 is the use in currently existing semiconductor and related gas delivery systems, there is no reason that the GFC shown in the figures could not be the combination of the special regulator along with the pressure transducer and critical orifice described by Ollivier in U.S. Pat. No. 6,363,958. See, e.g., optional pressure regulator 202 shown in broken line in FIG. 2.

While the above descriptions relate to accurate calculation of an actual magnitude of flow rate from a pressure drop, this is not required by the present invention. In accordance with alternative embodiments, a relative change in flow rate may be determined based upon a comparison of different pressure drop measurements.

For example, in certain embodiments two sets of pressure drop measurements may be taken to provide a relative measure of changed flow rate. In one embodiment, the first measurement may be taken from the GFC that is to be tested, with the second measurement taken from a GFC of known performance. A difference between the two pressure drop readings could reveal deviation of flow rate by the tested device, without determination of the actual flow rate.

In an alternative embodiment, a first pressure drop measurement may be taken at a first time with the GFC that is to be tested, with the second pressure drop measurement being taken from that same GFC at a second time. Again, a difference between the two pressure drop measurements readings could reveal the magnitude of change (drift) in the flow rate from the tested device, over time.

Since the present invention can be performed with automatic operation and since the measurements are being carried out in real time as the gas is being flowed into the process chamber, the present invention makes it possible to correct any deviation in the actual flow of gas while the process is being carried out. If, for example, the gas flow controller is set to 100 standard cubic centimeters per minute (sccm) of gas mass flow, and if the measured result is 98 sccm, the set point could be increased to 102 sccm, thus bringing the actual flow to the desired 100 sccm.

Figure 8:
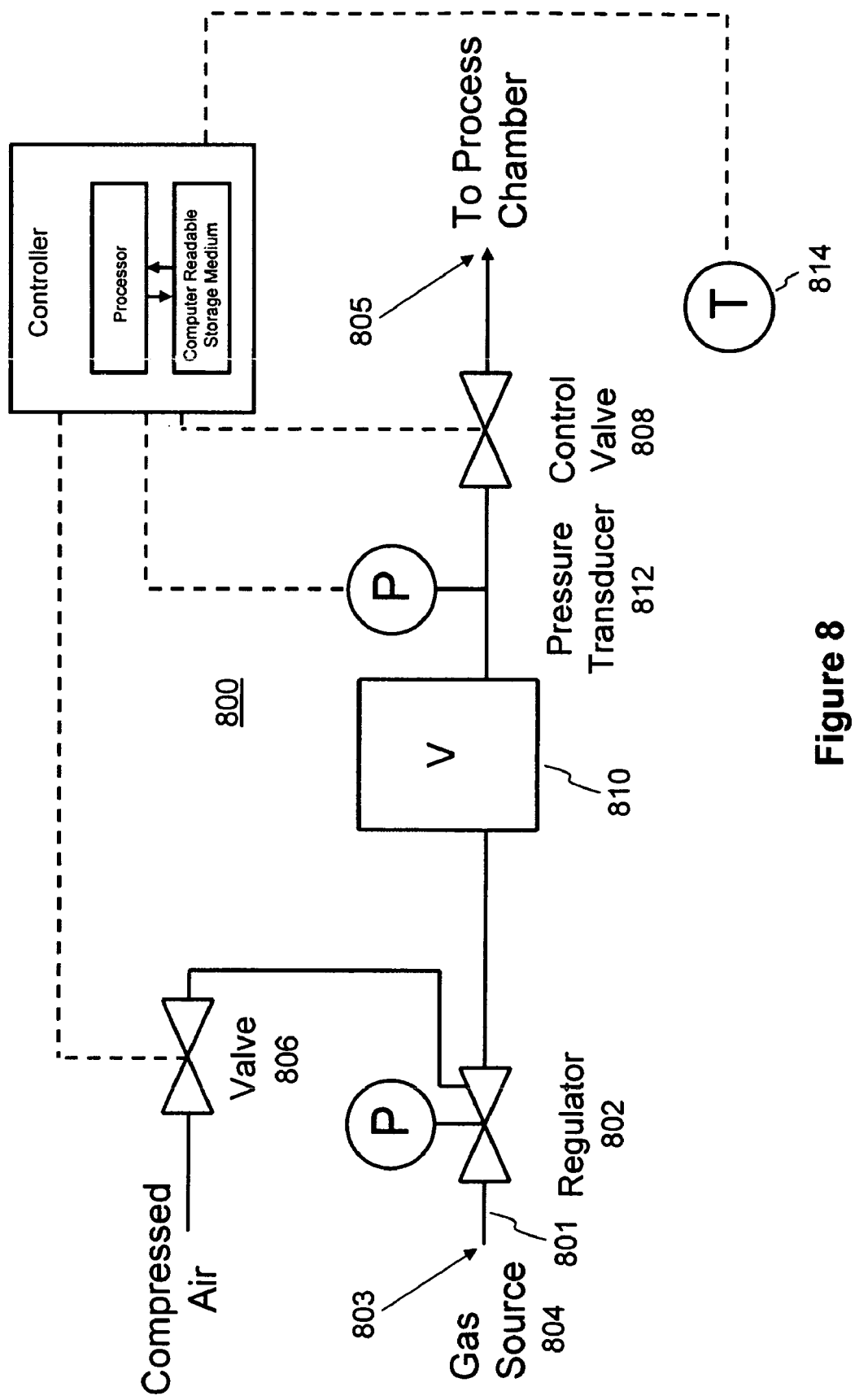
FIG. 8 is a simplified schematic diagram of an embodiment of an apparatus in accordance with the present invention that allows control of the gas flow rate through a control valve.

Taking this concept to its logical conclusion, FIG. 8 shows an embodiment in which the gas flow controller under test is replaced by a control valve. Instead of the present invention being used to correct the set point of a gas flow controller to obtain the desired flow, in this case the present invention is used to directly control the output control valve to provide the desired flow.

In a conventional mass flow controller, if the set point is changed, the controller notes a difference between the measured flow rate and the desired set point, and it changes the valve opening to minimize this difference. Within a matter of one to several seconds, the actual flow rate is very close to the desired flow rate. In the embodiment of FIG. 8, however, such an approach would take much longer. Since a number of measurements would need to be made as the position of control valve 808 was changed, and each measurement takes from approximately one-half to a few seconds, the time to get to the desired flow rate would be far too long. Fortunately, the present invention allows the capability for the controller that is taking the measurements and controlling the control valve 808 to have information, a priori, on the required valve position for a desired flow rate.

In the method of operation, referring to FIG. 8, before the system is used for control of gas flowing into a process, an initial calibration would take place in which a table would be generated relating pressure, temperature, drive signal for the control valve 808, and flow rate. This could be accomplished by carrying out a series of measurements where the valve position, as noted by the drive signal, was controlled such that the rate of pressure drop for each run was held constant. This pressure drop, in conjunction with the temperature and use of Equation (4), would provide the flow rate for that run. For each run, the rate of pressure drop would be held at a different level, thus allowing the generation of a table of valve positions for different flow rates at different pressures (and temperatures). Alternatively, one could merely use a separate measurement technique, such as a rate of rise volume positioned downstream of the control valve 808, to note the valve position for a given flow rate at a certain pressure and temperature, where the pressure was set and held constant by the pressure regulator. Since this initial calibration would only be done once, it would not be a large inconvenience to use a separate technique for measuring the flow.

Figure 8A:
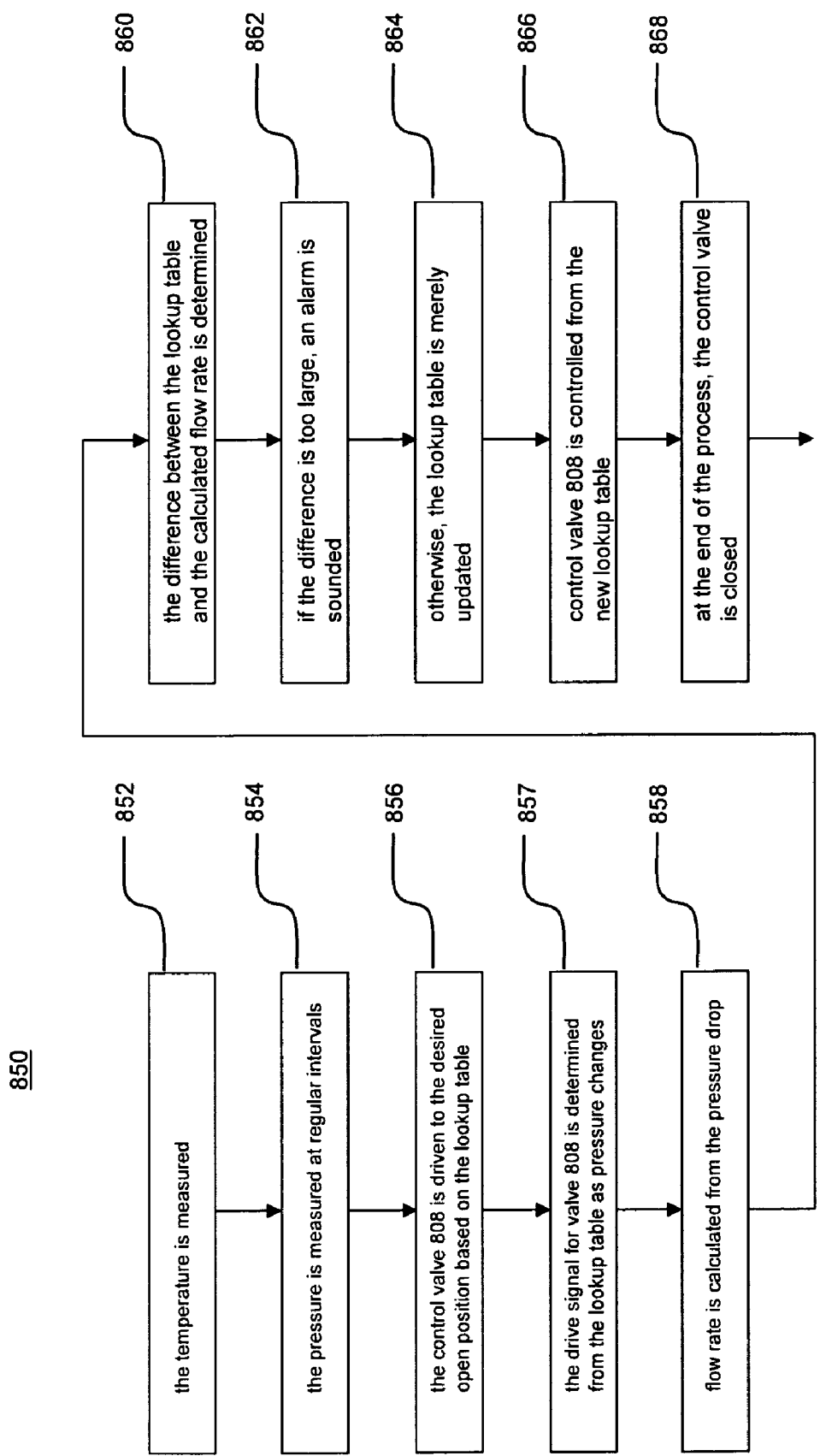
FIG. 8A is a simplified diagram illustrating a flow of steps performed according to the embodiment of FIG. 8.

Once the table was established, the procedure for controlling the flow of gas through the control valve 808 may be summarized in the process flow 850 of FIG. 8A as follows.

1. In step 852, the temperature is measured. This will be used in the lookup table as well as in the calculation of actual flow rate.

2. In step 854, the pressure is measured at regular intervals, typically every fraction of a second, starting before the time at which the flow begins. Using the temperature measured in step 852, and the pressure measured in this step, the lookup table is used to determine the required drive signal for control valve 808 to provide exactly the desired flow rate.

3. In step 856, at the time that the flow is to begin, the drive signal determined in step 854 is exerted on the control valve 808.

4. In step 857, the pressure is continuing to be measured at regular periods, and this pressure is used in the lookup table to determine the required position of the control valve 808, which will change as the pressure changes.

5. In step 858, after the pressure has dropped by some amount (typically 5-30% of the starting value), but before the pressure decreases to the set point of the pressure regulator 802, the flow rate is calculated (per Equation 4) from the measured pressure drop.

6. In step 860, the calculated flow rate as a function of pressure, temperature, and control valve drive signal is compared to the values in the lookup table.

7. In step 862, if the discrepancy is too large, typically more than 1%, an alarm is sent to notify the appropriate people to check the possible reasons for the discrepancy.

8. In step 864, if the discrepancy is sufficiently small, the lookup table is merely updated with the new values.

9. In step 866, as the pressure continues to decrease and eventually attains the value established by the pressure regulator 802, i.e., the normal regulator set point, the controller controls the drive signal to the control valve based on the new lookup table.

10. In step 868, at the end of the process, or at some other appropriate time, the control valve 808 is closed.

In an alternative approach, in step 866, rather than waiting for the pressure to drop to the set point of the regulator 802, one could control the effective set point, in a manner as described with respect to FIG. 6, such that soon after the flow rate was measured, the pressure was brought to a steady value.

In yet other embodiments, the metering valve of FIG. 4 or the shut off valve and restrictor of FIG. 4A could be substituted for the regulator 802 and valve 806 of FIG. 8. After the flow rate measurement is complete, the shut off valve and restrictor of FIG. 4A could be used to bring the pressure to the starting point, or the metering valve of FIG. 4 could be used to either hold the pressure constant or to slowly raise it.

In these alternative approaches, since there is the capability to undergo yet further pressure drops, one could make multiple measurements during the same process step. This could be especially valuable if the process step has a long duration.

Figure 9:
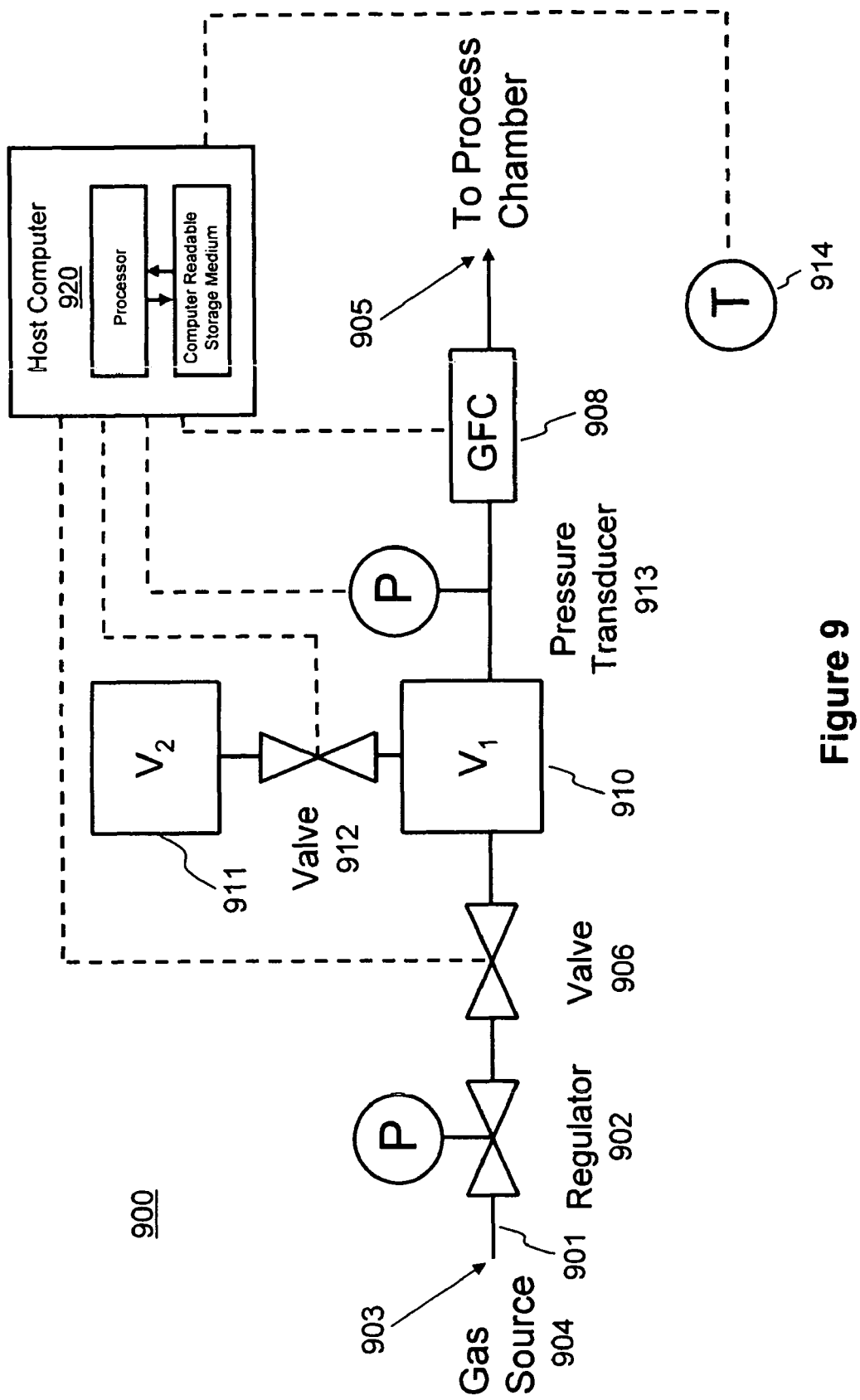
FIG. 9 illustrates another embodiment according to the invention, which allows determination of volume without having to change out any of the existing components.

FIG. 9 illustrates another embodiment according to the invention, which allows determination of volume without having to change out any of the existing components. While this feature is illustrated with respect to an arrangement mimicking that of FIG. 2, it should be readily appreciated that this feature may be implemented using any of the embodiments discussed above. In FIG. 9, apparatus 900 allows for in situ measurement of the volume V, where V=the total volume of the gas delivery system between the GFC and shut off valve 906 (or metering valve when the embodiment of FIG. 4 is used, or regulator when the embodiments of FIGS. 6 and 7 are used). In the specific embodiment of FIG. 9, the volume V is equal to $V_1+V_2$, where $V_2$ is the volume of chamber 911 having a known volume, and $V_1$ is the fixed volume (represented by box 910) of all other components in the gas delivery system between the GFC 908 and Valve 906.

In FIG. 9, the known volume $V_2$ is the volume of the chamber 911 when the Valve 912 is closed. This known volume $V_2$ can be determined prior to incorporation of chamber 911 into the gas delivery system, in any one of a number of ways. One direct method is to (1) fill the chamber with a liquid to a point beyond the valve 912, (2) close the valve 912, (3) pour off any liquid that is outside of the valve 912, and then (4) open the valve 912 and pour out the liquid into a measurement vessel such as a beaker or burette.

With the chamber 911 of known volume incorporated into the gas delivery system, the measurement of V may proceed. Specifically, evacuation of the fixed volume 910 by flow through the gas flow controller 908, followed by opening the second valve 912 to unite the fixed volume 910 with the chamber 911, can produce a pressure drop that allows accurate calculation of the fixed volume 910.

Figure 9A:
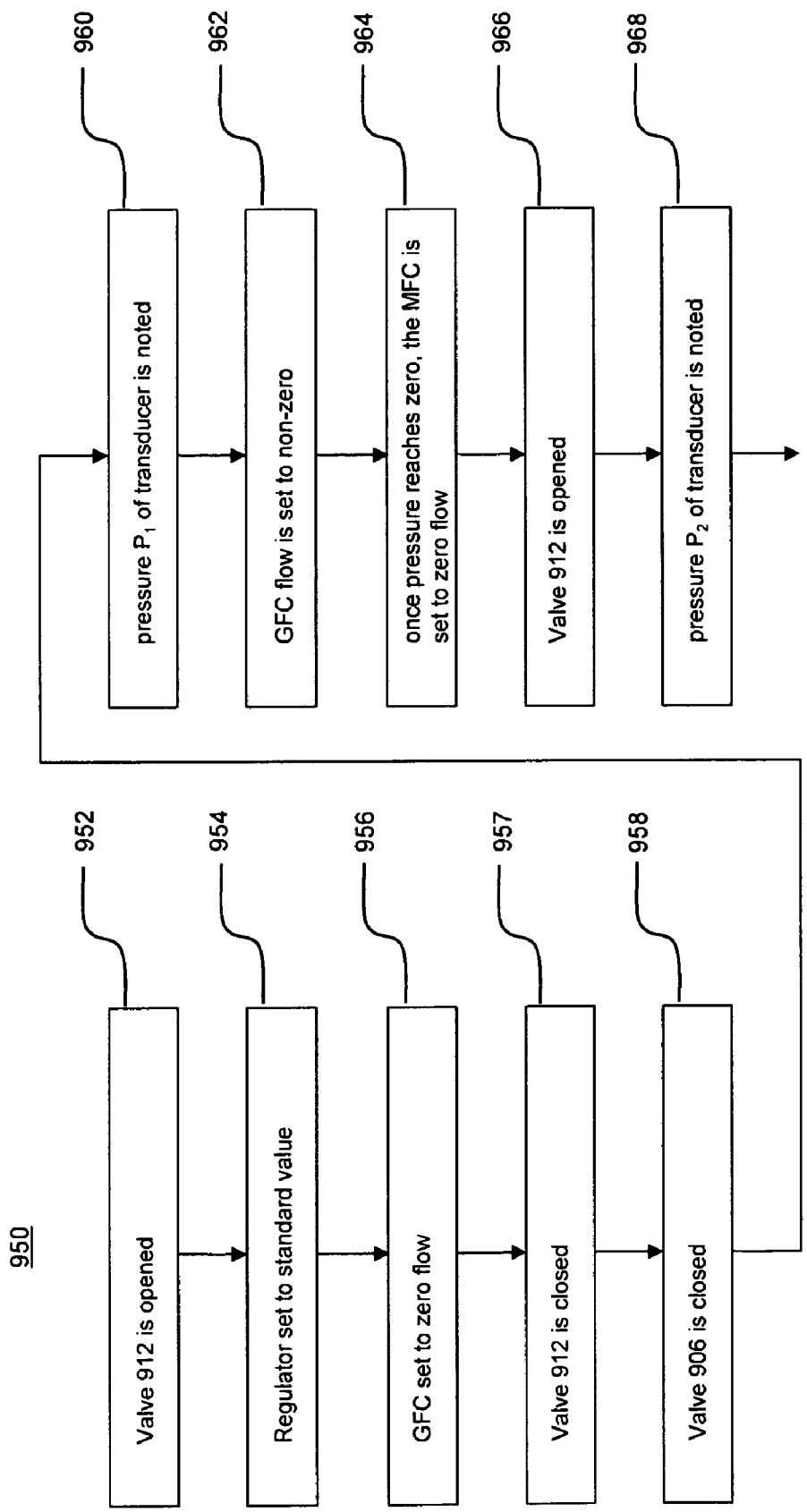
FIG. 9A provides a simplified diagram of the flow 950 of steps utilized with the apparatus of FIG. 9, according to an embodiment of the invention.

FIG. 9A provides a simplified diagram of the flow 950 of steps of this approach, which may be executed by computer 920.

1. In step 952, Valve 912 is opened (if it was closed). Valve 906 is assumed to be already open.
2. In step 954, the regulator 902 is set to its standard value (or any other appropriate value).
3. In step 956, the GFC is set to zero flow.
4. In step 957, Valve 912 is closed.
5. In step 958, Valve 906 is closed.
6. In step 960, the pressure under these conditions, $P_1$, is noted on the pressure transducer 913.
7. In step 962, the GFC is set to a flow that allows the pressure to decrease to essentially zero in a reasonable amount of time, evacuating the fixed volume $V_1$.
8. In step 964, after the pressure has reached zero, the GFC is set to zero flow.
9. In step 966, Valve 912 is opened, uniting the fixed volume $V_1$ with the known volume of chamber 911.
10. In step 968, the pressure under these conditions, $P_2$, is noted on the pressure transducer 913.

The amount of gas in the system at step 964 is given by $$n=P_1V_2/Z_1RT, \text{where} \qquad \text{Equation (5)}$$

$Z_1$=compressibility factor at pressure $P_1$.

The reason that $V_2$ is present in Equation (5) instead of V, is because in step 964 everything in the system except chamber 911 of volume $V_2$ was emptied of any gas.

At step 966, the total amount of gas in the system is still n, since no gas entered or exited the system between steps 964 and 966. In step 966 however, the gas is distributed throughout the total volume, V. Consequently, we can write:

$$n=P_2V/Z_2RT, \text{where}$$

$$V=V_1+V_2 \qquad \text{Equation (6)}$$

$Z_2$=compressibility factor at pressure $P_2$.

Combining Equations (5) and (6) yields:

$$P_1V_2/Z_1RT=P_2V/Z_2RT \qquad \text{Equation (7)}$$

Simplifying Equation (7) produces:

$$V=P_1V_2Z_2/P_2Z_1.$$

$V_1$ can then be obtained from the following equation:

$$V_1=V-V_2.$$

Determination of V and $V_1$ in this manner does require a separate step during which no productive use can be made of the processing chamber. However, this volume measurement would be expected to be carried out only relatively infrequently. Whereas the measurement of gas flow rate described above in connection with the other embodiments might be conducted on a daily basis or even more frequently, measurement of the volumes V and $V_1$ as described in connection with FIGS. 9-9A would be done upon first installation of the apparatus, and then perhaps only when a component of the system is changed.

The embodiment in FIG. 9 also provides yet another advantage. Specifically, depending on the magnitude of the flow rate or other factors, it may be advantageous to use either a smaller volume or a larger volume for testing the flow rate. For example, where the flow rate is small relative to the combined volume V, an excessively long testing period would be required to produce a pressure drop of sufficient magnitude to yield an accurate measurement of flow rate. Thus, after determination of the volume $V_1$, valve 912 could be closed such that only volume $V_1$ is used in lieu of V for the gas flow measurement. Conversely, where the flow rate is large relative to the fixed volume $V_1$, it may be appropriate to leave the second valve open to provide a larger combined volume ($V_1+V_2$) and thereby provide sufficient time for the pressure drop to take place. When the process performed in the process chamber requires changes in the gas flow rate during the process, the host computer may control valve 912 to match the volume to the gas flow. When the chamber consumes gas at a low rate, the host computer closes valve 912, so that only volume $V_1$ is utilized. Conversely, when the gas flow is increased, the host computer would open valve 912, so that volume V is utilized.

Figure 9B:
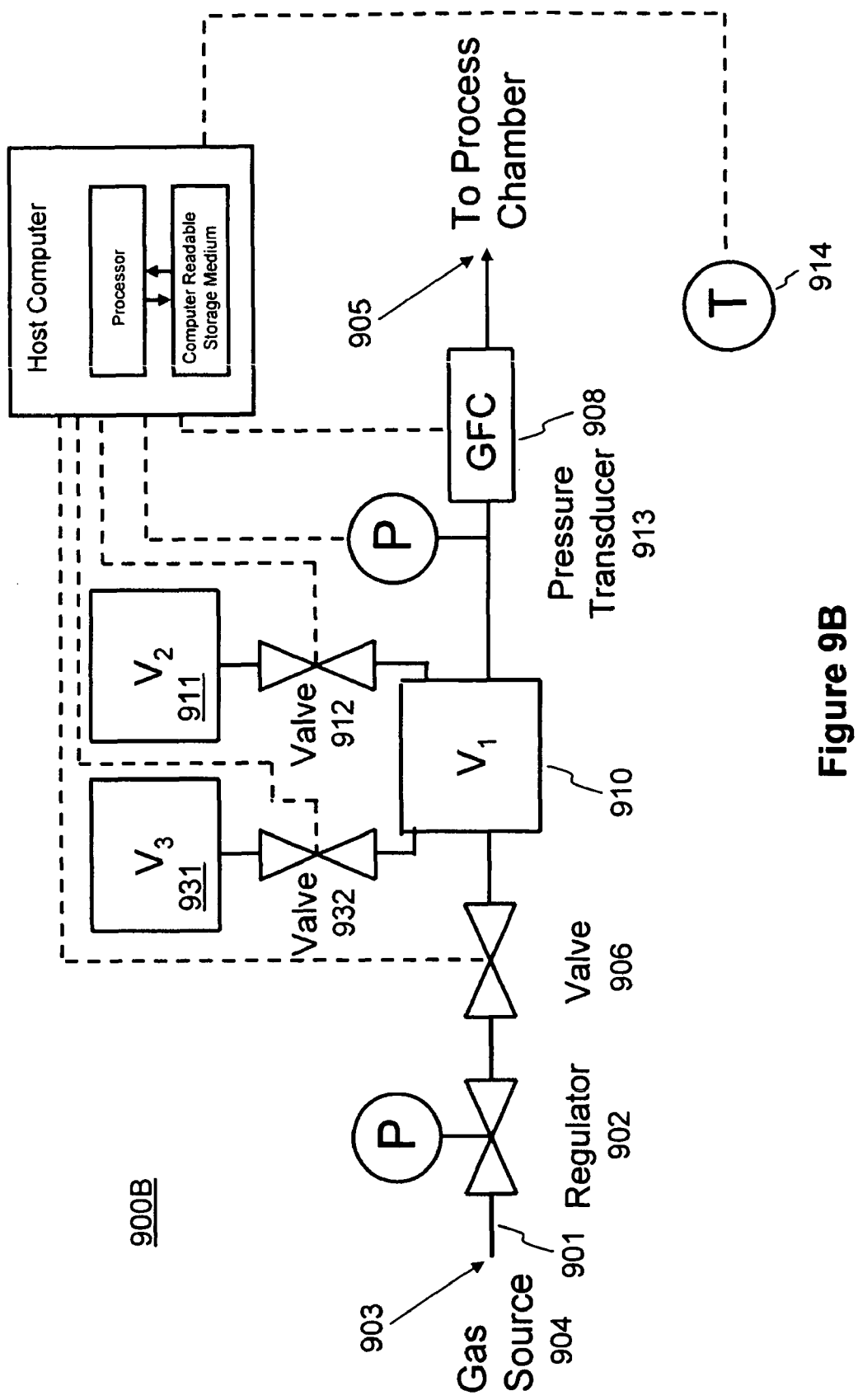
FIG. 9B illustrates a variation on the idea or variable volume, according to an embodiment of the invention.

FIG. 9B illustrates a variation on the idea of variable volume, according to an embodiment of the invention. In FIG. 9B, system 900B includes two additional volumes 911 and 931, which may be opened or closed to the system using valves 912 and 932. Volumes 911 and 931 may be of same or different value. Thus, depending on the flow of GFC 908, the utilized volume may be $V_1$, $V_1+V_2$, $V_1+V_3$, or $V_1+V_2+V_3$. Of course, additional volumes with corresponding valves may be added if needed.

Figure 9C:
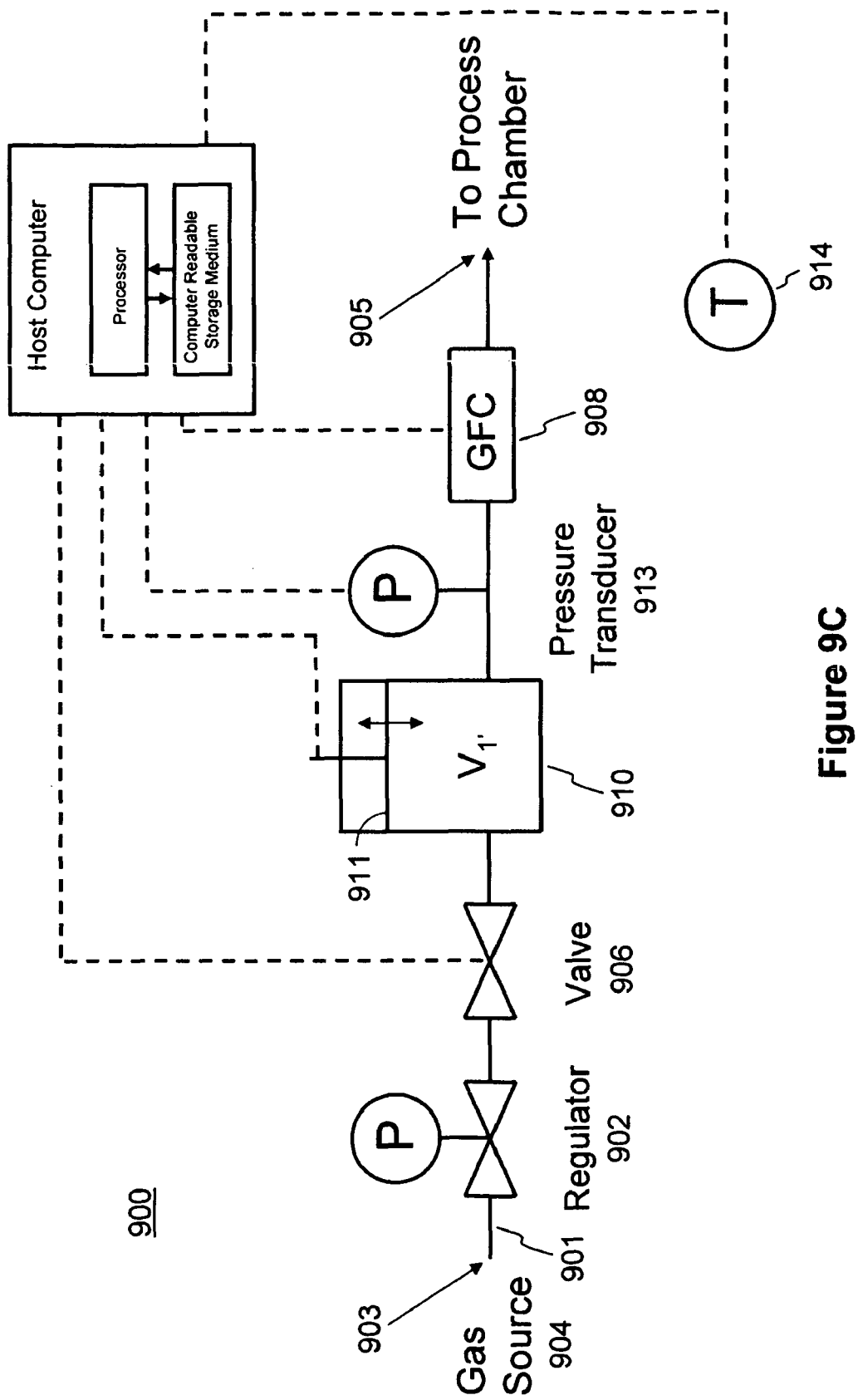
FIG. 9C illustrates a generalization on the idea or variable volume, according to an embodiment of the invention.

FIG. 9C illustrates a conceptual generalization on the idea of variable volume, according to an embodiment of the invention. In FIG. 9C the volume $V_{1'}$ is made variable, as conceptually illustrated by the membrane 911 and the double-headed arrow. The volume can be varied manually or using host computer, as illustrated by the broken line. The size of volume $V_{1'}$ may be set once for all processes, or may be changed during the process if the flow rate is changed during processing.

Yet another method can be used with the embodiment of FIG. 9 to determine the unknown volume $V_1$. The GFC is set to a flow rate that allows an accurate measurement of $(\Delta P/\Delta t)$ while utilizing either volume $V_1$ alone or $V_1+V_2$. For the initial part of the measurement, Valve 912 is open. A measurement, $(\Delta P/\Delta t)'$, is made under these conditions. While the GFC is still flowing, Valve 912 is closed. Another measurement, $(\Delta P/\Delta t)''$, is made. As shown in the equations below, the ratio of these two values of $(\Delta P/\Delta t)$ allows a determination of the unknown volume.

Repeating Equation (4):

$$\text{flow rate} = (\Delta P/\Delta t) V/ZRT \quad \text{Equation (4)}$$

Since the flow rate is unchanged for both parts of the measurement, $$(\Delta P/\Delta t)' V/ZRT = (\Delta P/\Delta t)'' V_1/ZRT \quad \text{Equation (8)}$$

This simplifies to $$V_1 = V_2/((\Delta P/\Delta t)''/(\Delta P/\Delta t)' - 1) \quad \text{Equation (9)}$$

One or more steps of the various embodiments of the present invention could be performed with manual or automatic operation. For example, the steps of opening/closing valves and taking pressure readings could be conducted automatically according to computer control, with the actual determination of the volume taking place manually or automatically. Alternatively, one or more of the various valves could be actuated manually, with the resulting flow rate calculated automatically from the detected pressure drop. Automatic operation of one or more steps could be accomplished based upon instructions stored in a computer readable storage medium of a host computer comprising a processor, utilizing communication through control lines as indicated by dashed-lines in the Figures.

Embodiments of the present invention may offer a number of advantages over conventional approaches. One advantage is that the testing of flow rate may be performed while the mass flow controller is going about its normal operation. Specifically, because the pressure variations caused by the opening and closing of the valves are controlled to prevent disturbance of the GFC, the GFC is able to maintain its specified flow rate despite the intentionally introduced changes in inlet pressure.

Gas flow testing can take place while the gas flow controller is operating normally to deliver gas to a processing chamber during production. Moreover, the testing apparatus is an integral part of the gas delivery system, and all steps of the gas flow testing can be automated. Accordingly, embodiments of the present invention lend themselves to fully automated operation, including the initiation of the testing procedure. For example, utilizing appropriate communication with the gas flow controller, the process tool, and/or the facility network, the flow rate test can be programmed to occur at every process step, or at a particular event, such as during a particular step of a particular process when the gas flow controller is set to a particular flow rate. Alternatively, the test can be programmed to take place at a certain time or times each day.

Embodiments of the present invention can also provide an alarm, which could include an audible or visual alarm located on the process tool. Alternatively or in conjunction with audio or visual alarms, an alarm in the form of an e-mail can be sent to one or more designated persons, if the measured flow rate is outside of certain limits. Such an approach works well in conjunction with the fully automated initiation and operation described above.

Embodiments of the present invention can also be used to measure the transient response of the MFC. When an MFC is perturbed, for example by turning it on or changing its set point or by suddenly increasing the pressure upstream of the MFC, it will take a few seconds to attain its steady state flow. During those few seconds, the flow rate of the MFC will deviate from the set point, often oscillating above and below the set point. The manner in which it deviates can be measured by the present invention by taking multiple pressure readings at a relatively high sampling rate (e.g., 10 to 100 readings per second) immediately after the MFC is perturbed. This measurement of the transient response has several advantages. One can monitor the transient response of a particular MFC over time; if changes are seen, it could be an indication of deterioration of one or more components within the MFC. One can also compare the transient response of identical MFCs from one chamber to another, thus enabling effective chamber matching. One could also use the transient response as a measure of the quality of a particular MFC or particular model or brand of MFC in order to choose the optimum MFC for the application.

Embodiments in accordance with the present invention also allow for essentially an unchanging environment to be presented to the gas being measured. Such unchanging conditions essentially prevent any errors associated with reactions with deposits or adsorbed gases inside the system, from disturbing the outcome.

Embodiments of the present invention also allow for a rapid determination of the system volume, measured by the system itself, if anything associated with the system is changed. This obviates the need for manually-intensive time-consuming measurements, such as those that would be needed to determine the volume of the process chamber.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the server arts. It is intended that the specification and examples be considered as exemplary only, with a true scope and spirit of the invention being indicated by the following claims.

What is claimed is:

1. An apparatus for determining a flow rate of a gas through a gas flow controller, the apparatus comprising:
   means for fixing a known volume upstream of the gas flow controller by interrupting the gas flow upstream of the known volume;
   means for measuring the rate of drop in pressure in the fixed volume; and
   means for reestablishing the gas flow into the known volume in such a way that the gas flow through the gas flow controller is not perturbed beyond a certain level; and,
   wherein the means for fixing a known volume upstream of the gas flow controller comprises a pressure regulator.

2. The apparatus of claim 1, wherein the certain level is one of 10%, 5%, or 1%.

3. The apparatus of claim 1, further comprising means for changing set point of the pressure regulator.

4. The apparatus of claim 1, further comprising a bypass in parallel with the pressure regulator.

* * * * *